US011805551B2

(12) United States Patent
Sun et al.

(10) Patent No.: US 11,805,551 B2
(45) Date of Patent: Oct. 31, 2023

(54) CONTENTION-BASED CHANNEL ACCESS BASED ON DIFFERENT CHANNEL ACCESS REQUIREMENTS

(71) Applicant: QUALCOMM Incorporated, San Diego, CA (US)

(72) Inventors: Yanjun Sun, San Diego, CA (US); George Cherian, San Diego, CA (US); Maarten Menzo Wentink, Nijmegen (NL); Sai Yiu Duncan Ho, San Diego, CA (US); Abhishek Pramod Patil, San Diego, CA (US); Alfred Asterjadhi, San Diego, CA (US); Gaurang Naik, San Diego, CA (US); Abdel Karim Ajami, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 17/455,866

(22) Filed: Nov. 19, 2021

(65) Prior Publication Data

US 2023/0189337 A1    Jun. 15, 2023

(51) Int. Cl.
*H04W 74/08* (2009.01)
*H04B 17/318* (2015.01)
*H04W 52/24* (2009.01)

(52) U.S. Cl.
CPC ...... *H04W 74/0816* (2013.01); *H04B 17/318* (2015.01); *H04W 52/245* (2013.01)

(58) Field of Classification Search
None
See application file for complete search history.

(56) References Cited

U.S. PATENT DOCUMENTS

| 2018/0376339 | A1* | 12/2018 | Hu | H04L 5/0098 |
| 2021/0144767 | A1 | 5/2021 | Guo et al. | |
| 2022/0095282 | A1* | 3/2022 | Jang | H04L 1/08 |
| 2022/0345991 | A1* | 10/2022 | Changlani | H04W 48/10 |

FOREIGN PATENT DOCUMENTS

WO    WO-2017014685 A1    1/2017

OTHER PUBLICATIONS

International Search Report and Written Opinion—PCT/US2022/078236—ISA/EPO—dated Dec. 22, 2022.

* cited by examiner

*Primary Examiner* — Hong Shao
(74) *Attorney, Agent, or Firm* — Polsinelli / Qualcomm

(57) ABSTRACT

This disclosure provides methods, devices and systems for providing energy detection based resolution in radio access technologies. In one aspect, a wireless communication device may include a first energy detection threshold (EDT) to identify a transmission opportunity in an unlicensed frequency band. The wireless communication device may detect a second wireless communication device having a second EDT to identify the transmission opportunity, the second EDT being greater than the first EDT. The wireless communication device may, based on detection of the second wireless communication device having the second EDT, modify a transmission configuration of the first wireless communication device.

28 Claims, 16 Drawing Sheets

CONTENTION-BASED CHANNEL ACCESS BASED ON DIFFERENT CHANNEL ACCESS REQUIREMENTS

TECHNICAL FIELD

This disclosure relates generally to wireless communication, and more particularly, to contention-based channel access techniques involving energy detection by wireless communication devices having different channel access requirements.

BACKGROUND

A wireless local area network (WLAN) may be formed by one or more wireless access points (APs) that provide a shared wireless communication medium in an unlicensed band for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a BSS Identifier (BSSID) that is advertised by the AP. An AP periodically broadcasts beacon frames to enable any STAs within wireless range of the AP to establish or maintain a communication link with the WLAN.

Other wireless communication systems (for example, 4G or 5G) may also use an unlicensed band for communication between a base station and multiple client devices each referred to as a user equipment (UE). A wireless communication system (for example, a legacy Wi-Fi or WLAN system) may have different requirements to access a channel than other wireless communication systems (for example, non-legacy Wi-Fi or WLAN systems, 4G or 5G communication systems, etc.). For instance, a communication system (for example, a legacy Wi-Fi or WLAN system) may have a more relaxed channel access requirement as compared to a communication system (for example, a non-legacy Wi-Fi or WLAN system, a 4G or 5G communication system, etc.) that has a more stringent channel access requirement, which can create bias in channel access opportunities. An example of a channel access requirement is an energy detection (ED) threshold (EDT). In one example, the communication system with the relaxed channel access requirement can more easily access a channel (for example, transmit on the channel) and thus may suppress an opportunity (for example, transmission opportunity) of the communication system with the more stringent channel access requirement to access the channel. In such an example, the communication system with the more stringent channel access requirement will defer a channel access opportunity (for example, transmission opportunity) based on the channel access requirement not being met (e.g., energy or power of the channel being greater than an EDT of the communication system).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication by a first wireless communication device configured with a first energy detection (ED) threshold (EDT) for detecting a channel busy condition on a first channel. The method includes detecting a second wireless communication device configured with a second EDT for detecting a channel busy condition on the first channel. The second EDT is greater than the first EDT. The method further includes modifying a transmission configuration of the first wireless communication device based on the detection of the second wireless communication device. The method further includes transmitting data based on the modified transmission configuration.

Another innovative aspect of the subject matter described in this disclosure can be implemented in a wireless communication device configured with a first energy detection (ED) threshold (EDT) for detecting a channel busy condition on a first channel. The wireless communication device includes at least one modem. The wireless communication device can further include at least one transceiver coupled to the at least one modem and at least one antenna coupled to the at least one transceiver to wirelessly transmit signals output from the at least one transceiver and to wirelessly receive signals for input into the at least one transceiver. The wireless communication device can further includes at least one processor communicatively coupled with the at least one modem and at least one memory communicatively coupled with the at least one processor and storing processor-readable code that, when executed by the at least one processor in conjunction with the at least one modem: detect a second wireless communication device configured with a second EDT for detecting a channel busy condition on the first channel, the second EDT being greater than the first EDT; modify, based on the detection of the second wireless communication device, a transmission configuration of the first wireless communication device; and transmit data based on the modified transmission configuration.

In some implementations, to detect the second wireless communication device, the method and wireless communication device may be configured to obtain a beacon report that indicates a presence of the second wireless communication device.

In some implementations, the method and wireless communication device may be configured to perform a beacon scan to identify wireless communication devices within a wireless communication range of the first wireless communication device.

In some implementations, detecting the second wireless communication device is based on at least one of a basic service set (BSS) color, a received signal strength indication (RSSI), a media access control (MAC) address, or a BSS identifier (BSSID).

In some implementations, to detect the second wireless communication device, the method and wireless communication device may be configured to: receive, from the second wireless communication device on the first channel, a physical layer protocol data unit (PPDU); identify a format of the PPDU; and determine the second EDT based on the format of the PPDU.

In some implementations, to detect the second wireless communication device, the method and wireless communication device may be configured to: transmit a message to a third wireless communication device, wirelessly connected with the first wireless communication device, that indicates to the third wireless communication device to sniff for packets from other wireless communication devices within a wireless communication range of the third wireless communication device; and receive a report, from the third wireless communication device, that includes information indicating a presence of the second wireless communication device.

In some implementations, to modify the transmission configuration, the method and wireless communication device may be configured to: switch from communicating on the first channel to communicating on a second channel.

In some implementations, to modify the transmission configuration, the method and wireless communication device may be configured to: transmit a trigger frame on the first channel that does not require a responding device to consider a medium state or a network allocation vector in determining whether or not to respond to the trigger frame.

In some implementations, the first channel is associated with a first frequency band. In some aspects, to modify the transmission configuration, the method and wireless communication device may be configured to identify that a second channel of the first frequency band is unavailable for transmitting the data. In some aspects, the method and wireless communication device may be configured to transmit the data using a channel of a second frequency band that is different from the first frequency band based on identifying that the second channel is unavailable for transmitting the data.

In some implementations, to modify the transmission configuration, the method and wireless communication device may be configured to perform a preamble puncturing operation to avoid transmission using a first bandwidth configured for use by the second wireless communication device. In some aspects, the method and wireless communication device may be configured to transmit the data using a second bandwidth based on the preamble puncturing operation.

In some implementations, to modify the transmission configuration, the method and wireless communication device may be configured to switch from using the first EDT to using the second EDT for detecting a channel busy condition.

In some implementations, to modify the transmission configuration, the method and wireless communication device may be configured to reduce a transmission power of the first wireless communication device based on a received signal strength indication (RSSI) from the second wireless communication device.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

Like reference numbers and designations in the various drawings indicate like elements.

DETAILED DESCRIPTION

Figure 1:
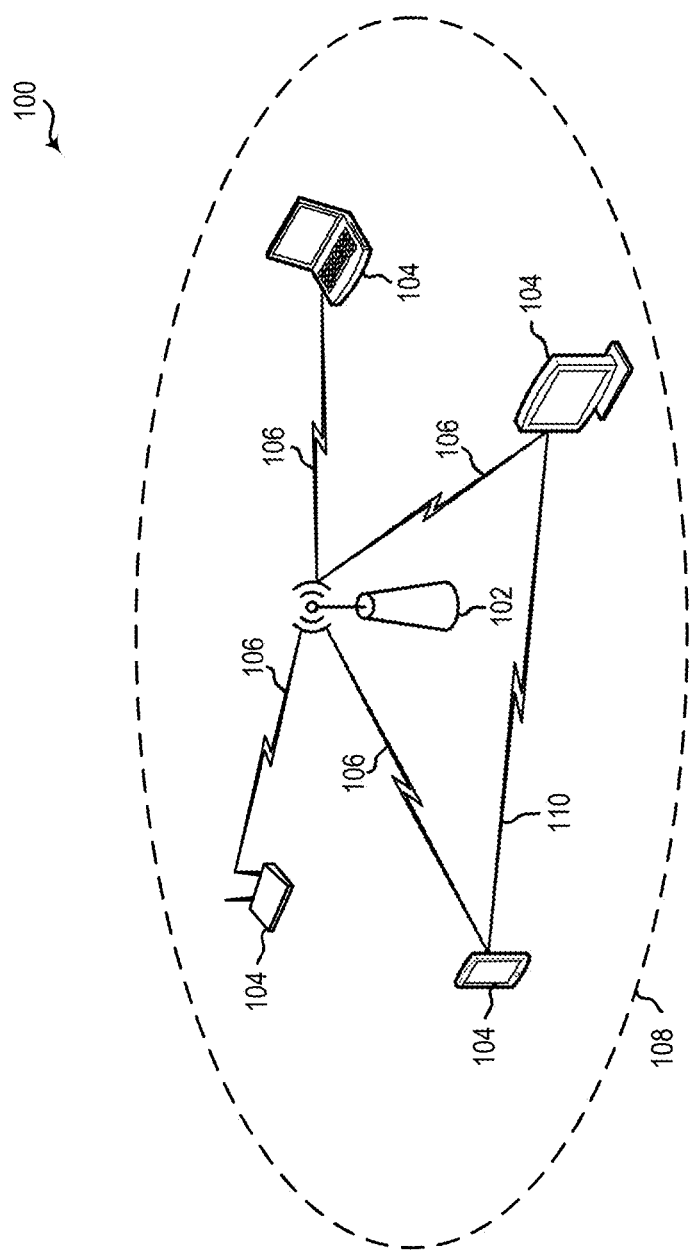
FIG. 1 shows a block diagram of an example wireless communication network, in accordance with some examples.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multiuser (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Wireless communication devices in WLAN systems operating in an unlicensed band, such as the 2.4, 5, or 6 gigahertz (GHz) bands, generally perform a clear channel assessment (CCA) operation based on a channel access requirement before transmission. For example, a wireless communication device can detect the energy of signals or noise on a channel (referred to as energy detection (ED)) to identify whether the channel is available for transmission, or, conversely, whether the channel is busy (or otherwise not available). An example of a channel access requirement involves the use of an ED threshold (EDT). A wireless communication device that is contending for access to the shared wireless medium compares the energy it detects on the channel to the associated EDT. If the detected energy is lower than the EDT, the device is generally permitted to transmit because the wireless medium is considered available. If the detected energy is greater than the EDT, the device is required to defer transmission because the wireless medium is considered busy.

Legacy wireless communication devices (for example, wireless communication devices supporting 802.11n, 802.11ac, or 802.11ax modes of operation but not supporting 802.11be or later versions of the 802.11 family of standards) contend for access based on a legacy EDT defined as a fixed power of −62 decibels per milliwatt (dBm). However, other wireless communication devices that operate in the unlicensed band, such as non-legacy WLAN devices that operate according to 802.11be or later versions of the IEEE family of standards, or cellular devices that operate according to 3GPP protocols (for example, LTE or 5G/NR), can implement different EDTs and operations for determining whether a shared wireless communication medium is available for transmission. For example, a user equipment (UE) operating in a 5G/NR unlicensed (NR-U) mode in the 5 GHz frequency band can have a non-legacy EDT of −69 dBm. As another example, a non-legacy WLAN device that operates according to communication modes which are being developed (for example, 802.11be) can use a non-legacy EDT that is less than the legacy WLAN EDT. For example, the non-legacy EDT can be set to −72 dBm, which is 10 dBm less than the legacy EDT of −62 dBm.

The use of different EDTs by different wireless communication devices to identify channel access opportunities (for example, transmission opportunities) can result in some wireless communication devices having an advantage in identifying channel access opportunities over other wireless communication devices. For example, if a legacy wireless communication device operating using a legacy EDT of −62 dBm and a non-legacy wireless communication device operating using a non-legacy EDT of −72 dBm detect a power of −64 dBm on a channel, the legacy wireless communication device will determine that the channel is available for transmission based on the detected power being lower than the legacy EDT. However, the non-legacy wireless communication device operating with the non-legacy EDT will defer transmission because the channel is considered busy based on the detected power being greater than the non-legacy EDT.

Aspects described herein relate generally to contention-based channel access techniques involving energy detection by wireless communication devices having different channel access requirements. For example, a non-legacy wireless communication device having the non-legacy EDT can directly or indirectly identify one or more legacy wireless communication devices having a legacy EDT. In some aspects, in response to identifying a legacy wireless communication device, the non-legacy wireless communication device can modify a transmission configuration. In some aspects, the non-legacy wireless communication device can modify a transmission configuration by transmitting using a second channel that is different than a first channel on which the legacy wireless communication device is identified, switching from using the non-legacy EDT to using the legacy EDT to determine whether the first channel is busy, puncturing frequencies of the first channel associated with the legacy wireless communication device, disabling carrier sensing, reducing transmission power of the non-legacy wireless communication device, disabling ED detection by switching to a data and acknowledgement mode, any combination thereof, and/or perform other techniques. For example, switching to a different channel results in the legacy wireless communication device and the wireless communication device using different physical resources.

Particular implementations of the subject matter described in this disclosure can be implemented to realize one or more of the following potential advantages. In some implementations, by modifying a transmission configuration of a non-legacy wireless communication device that uses a non-legacy EDT, the techniques described herein can promote channel access fairness. Specifically, a non-legacy device can be afforded more transmission opportunities by preempting what would otherwise be transmission deferral when the non-legacy device detects energy above the non-legacy EDT.

FIG. 1 shows a block diagram of an example wireless communication network 100. According to some aspects, the wireless communication network 100 can be an example of a WLAN such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an AP 102 and multiple STAs 104. While only one AP 102 is shown, the WLAN 100 also can include multiple APs 102.

Each of the STAs 104 also may be referred to as a mobile station (MS), a mobile device, a mobile handset, a wireless handset, an access terminal (AT), a UE, a subscriber station (SS), or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, the STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. After association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such aspects, while the STAs 104 may be capable of communicating with each other through the AP 102 using communication links 108, STAs 104 also can communicate directly with each other via direct wireless links 110. Two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). These standards define the WLAN radio and baseband protocols for the physical (PHY) and MAC layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
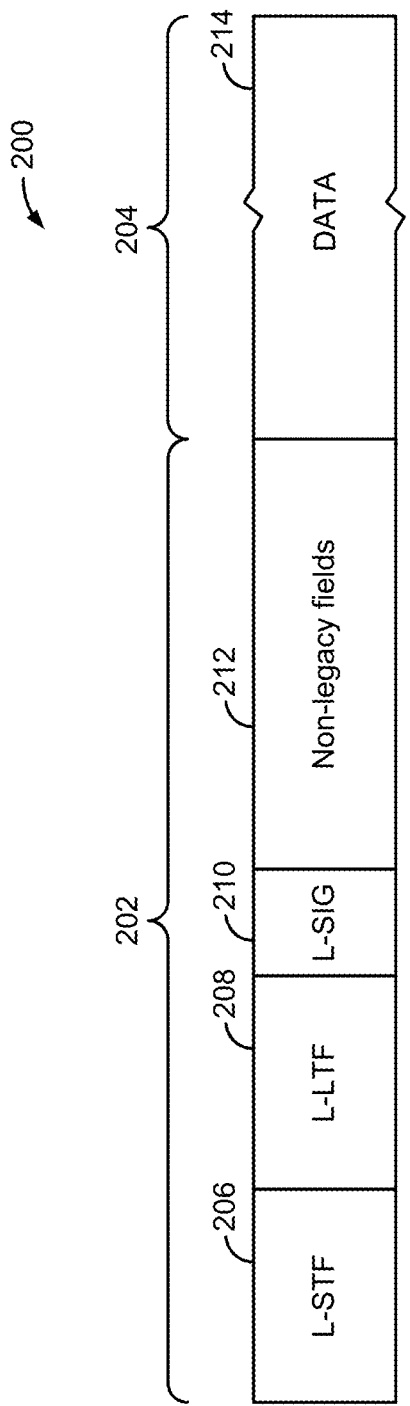
FIG. 2A shows an example protocol data unit (PDU) usable for communications between an access point (AP) and one or more stations (STAs), in accordance with some examples.

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two binary phase shift keying (BPSK) symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a BPSK modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Figure 2B:
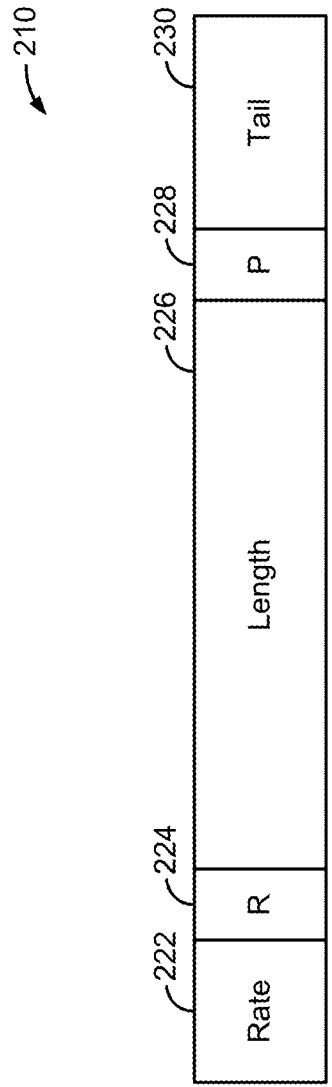
FIG. 2B shows an example field in the PDU of FIG. 2A, in accordance with some examples.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3A:
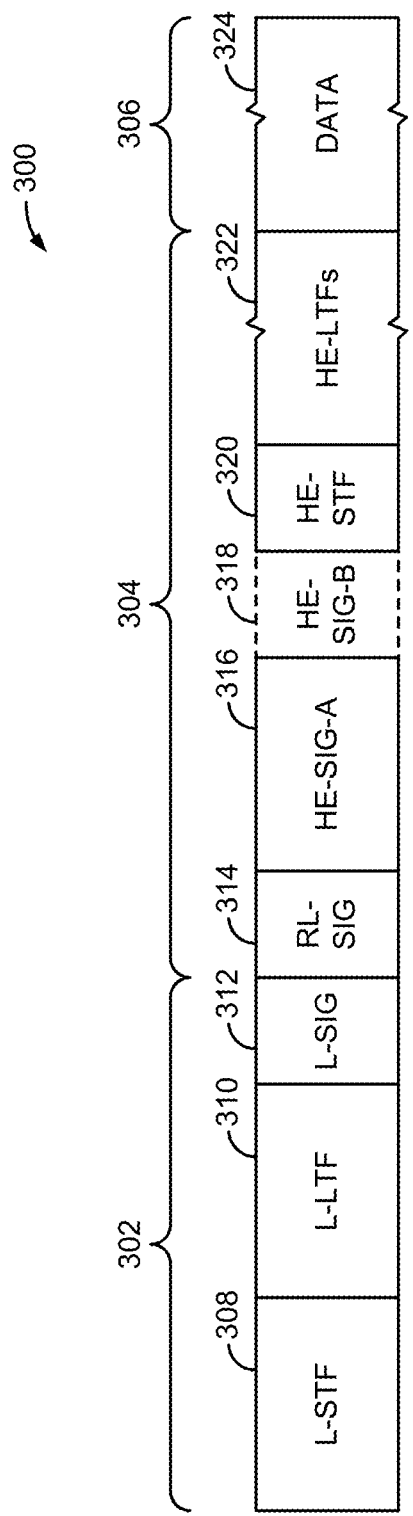
FIG. 3A shows an example physical (PHY) layer convergence protocol (PLCP) protocol data unit (PPDU) usable for communications between an AP and one or more STAs, in accordance with some examples.

FIG. 3A shows an example PPDU 300 usable for wireless communication between an AP and one or more STAs. The PPDU 300 may be used for SU, OFDMA or MU-MIMO transmissions. The PPDU 300 may be formatted as a High Efficiency (HE) WLAN PPDU in accordance with the IEEE 802.11ax amendment to the IEEE 802.11 wireless communication protocol standard. The PPDU 300 includes a PHY preamble including a legacy portion 302 and a non-legacy portion 304. The PPDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. HE-STF 320 may be used for timing and frequency tracking and AGC, and HE-LTF 322 may be used for more refined channel estimation. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PPDU 300 is an HE PPDU. An AP 102 may use HE-SIG-A 316 to identify and inform multiple STAs 104 that the AP has scheduled uplink (UL) or downlink (DL) resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific resource unit (RU) allocation information. In the context of DL MU-OFDMA, such information enables the respective STAs 104 to identify and decode corresponding RUs in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, cyclic redundancy check (CRC) bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
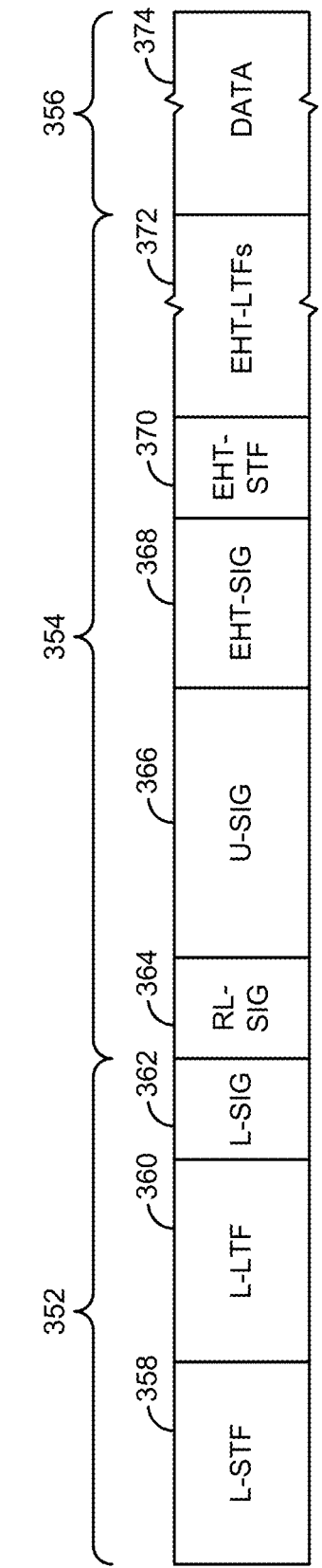
FIG. 3B shows another example PPDU usable for communications between an AP and one or more STAs, in accordance with some examples.

FIG. 3B shows another example PPDU 350 usable for wireless communication between an AP and one or more STAs. The PPDU 350 may be used for SU, OFDMA or MU-MIMO transmissions. The PPDU 350 may be formatted as an extremely high throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation. Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user signaling information such as MCSs, among other examples. EHT-SIG 368 may further include a CRC (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 374. In the context of DL MU-OFDMA, such information enables the respective STAs 104 to identify and decode corresponding RUs in the associated data field 374. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 374.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it waits for a particular time and then contend for access to the wireless medium. In some aspects, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a network allocation vector (NAV), an indicator of a time when the medium may next become idle. The NAV is reset each time a valid frame is received that is not addressed to the wireless communication device. The NAV effectively serves as a time duration that elapses before the wireless communication device may contend for access even in the absence of a detected symbol or even if the detected energy is below the relevant threshold.

As described above, the DCF is implemented through the use of time intervals. These time intervals include the slot time (or "slot interval") and the inter-frame space (IFS). The slot time is the basic unit of timing and may be determined based on one or more of a transmit-receive turnaround time, a channel sensing time, a propagation delay and a MAC processing time. Measurements for channel sensing are performed for each slot. All transmissions may begin at slot boundaries. Different varieties of IFS exist including the short IFS (SIFS), the distributed IFS (DIFS), the extended IFS (EIFS), and the arbitration IFS (AIFS). For example, the DIFS may be defined as the sum of the SIFS and two times the slot time. The values for the slot time and IFS may be provided by a suitable standard specification, such as one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be).

When the NAV reaches 0, the wireless communication device performs the physical carrier sensing. If the channel remains idle for the appropriate IFS (for example, the DIFS), the wireless communication device initiates a backoff timer, which represents a duration of time that the device senses the medium to be idle before it is permitted to transmit. The backoff timer is decremented by one slot each time the medium is sensed to be idle during a corresponding slot interval. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Each time the wireless communication device generates a new PPDU for transmission in a new TXOP, it randomly selects a new backoff timer duration. The available distribution of the numbers that may be randomly selected for the backoff timer is referred to as the contention window (CW). If, when the backoff timer expires, the wireless communication device transmits the PPDU, but the medium is still busy, there may be a collision. If there is otherwise too much energy on the wireless channel resulting in a poor signal-to-noise ratio (SNR), the communication may be corrupted or otherwise not successfully received. In such instances, the wireless communication device may not receive a communication acknowledging the transmitted PDU within a timeout interval. The MAC may then increase the CW exponentially, for example, doubling it, and randomly select a new backoff timer duration from the CW before each attempted retransmission of the PPDU. Before each attempted retransmission, the wireless communication device may wait a duration of DIFS and, if the medium remains idle, then proceed to initiate the new backoff timer. There are different CW and TXOP durations for each of the four access categories (ACs): voice (AC_VO), video (AC_VI), background (AC_BK), and best effort (AC_BE). The different durations and access categories enable particular types of traffic to be prioritized in the network.

Some APs and STAs may be configured to implement spatial reuse techniques. For example, APs and STAs configured for communications using IEEE 802.11ax or 802.11be may be configured with a BSS color. APs associated with different BSSs may be associated with different BSS colors. If an AP or a STA detects a wireless packet from another wireless communication device while contending for access, the AP or STA may apply different contention parameters based on whether the wireless packet is transmitted by, or transmitted to, another wireless communication device within its BSS or from a wireless communication device from an overlapping BSS (OBSS), as determined by a BSS color indication in a preamble of the wireless packet. For example, if the BSS color associated with the wireless packet is the same as the BSS color of the AP or STA, the AP or STA may use a first RSSI detection threshold when performing a CCA on the wireless channel. However, if the BSS color associated with the wireless packet is different than the BSS color of the AP or STA, the AP or STA may use a second RSSI detection threshold in lieu of using the first RSSI detection threshold when performing the CCA on the wireless channel, the second RSSI detection threshold being greater than the first RSSI detection threshold. In this way, the requirements for winning contention are relaxed when interfering transmissions are associated with an OBSS.

Figure 4:
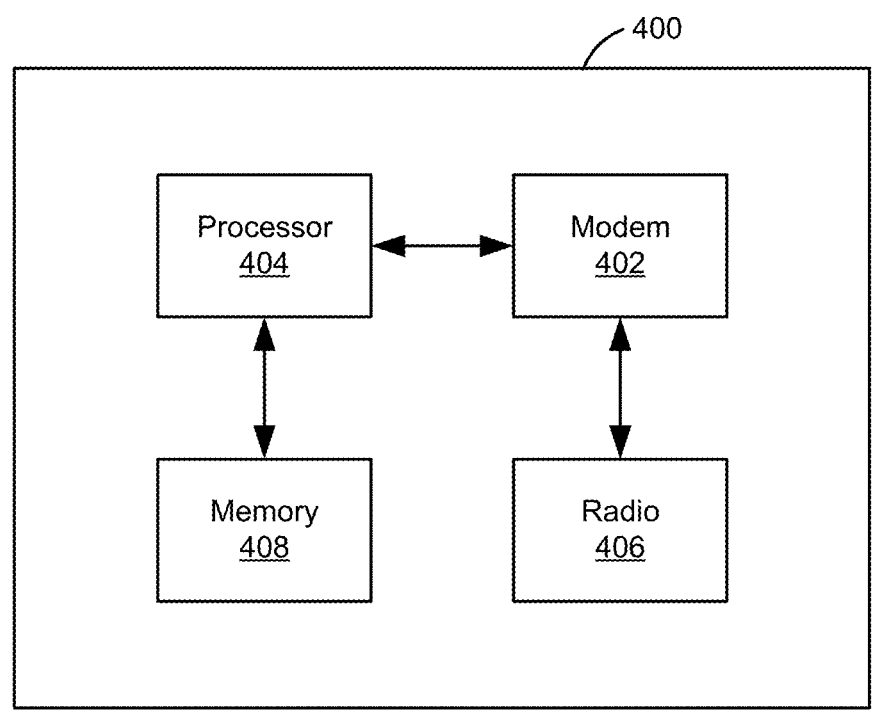
FIG. 4 shows a block diagram of an example wireless communication device, in accordance with some examples.

FIG. 4 shows a block diagram of an example wireless communication device 400. In some aspects, the wireless communication device 400 can be an example of a device for use in a STA such as one of the STAs 104 described above with reference to FIG. 1. In some aspects, the wireless communication device 400 can be an example of a device for use in an AP such as the AP 102 described above with reference to FIG. 1. The wireless communication device 400 is capable of transmitting and receiving wireless communications in the form of, for example, wireless packets. For example, the wireless communication device can be configured to transmit and receive packets in the form of PPDUs and MPDUs conforming to an IEEE 802.11 wireless communication protocol standard, such as that defined by the IEEE 802.11-2016 specification or amendments thereof including, but not limited to, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some aspects, the one or more modems 402 (collectively "the modem 402") additionally include a WWAN modem (for example, a 3GPP 4G LTE or 5G compliant modem). In some aspects, the wireless communication device 400 also includes one or more processors, processing blocks or processors 404 (collectively "the processor 404") coupled with the modem 402. In some aspects, the wireless communication device 400 additionally includes one or more radios 406 (collectively "the radio 406") coupled with the modem 402. In some aspects, the wireless communication device 400 further includes one or more memory blocks or elements (collectively "the memory 408") coupled with the processor 404 or the modem 402.

The modem 402 can include an intelligent hardware block or device such as, for example, an application-specific integrated circuit (ASIC), among other examples. The modem 402 is generally configured to implement a PHY layer, and in some implementations, also a portion of a MAC layer (for example, a hardware portion of the MAC layer). For example, the modem 402 is configured to modulate packets and to output the modulated packets to the radio 406 for transmission over the wireless medium. The modem 402 is similarly configured to obtain modulated packets received by the radio 406 and to demodulate the packets to provide demodulated packets. In addition to a modulator and a demodulator, the modem 402 may further include digital signal processing (DSP) circuitry, AGC circuitry, a coder, a decoder, a multiplexer and a demultiplexer. For example, while in a transmission mode, data obtained from the processor 404 may be provided to an encoder, which encodes the data to provide coded bits. The coded bits may then be mapped to a number $N_{SS}$ of spatial streams for spatial multiplexing or a number $N_{STS}$ of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 406. In implementations involving beamforming, the modulated symbols in the respective spatial streams are precoded via a steering matrix prior to their provision to the IFFT block.

While in a reception mode, the DSP circuitry is configured to acquire a signal including modulated symbols received from the radio 406, for example, by detecting the presence of the signal and estimating the initial timing and frequency offsets. The DSP circuitry is further configured to digitally condition the signal, for example, using channel (narrowband) filtering and analog impairment conditioning (such as correcting for I/Q imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be descrambled and provided to the MAC layer (the processor 404) for processing, evaluation or interpretation.

The radio 406 generally includes at least one RF transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some aspects, the wireless communication device 400 can include, or be coupled with, multiple transmit antennas (each with a corresponding transmit chain) and multiple receive antennas (each with a corresponding receive chain). The symbols output from the modem 402 are provided to the radio 406, which then transmits the symbols via the coupled antennas. Similarly, symbols received via the antennas are obtained by the radio 406, which then provides the symbols to the modem 402.

The processor 404 can include an intelligent hardware block or device such as, for example, a processing core, a processing block, a central processing unit (CPU), a microprocessor, a microcontroller, a DSP, an ASIC, a programmable logic device (PLD) such as a field programmable gate array (FPGA), discrete gate or transistor logic, discrete hardware components, or any combination thereof designed to perform the functions described herein. The processor 404 processes information received through the radio 406 and the modem 402, and processes information to be output through the modem 402 and the radio 406 for transmission through the wireless medium. For example, the processor 404 may implement a control plane and at least a portion of a MAC layer configured to perform various operations related to the generation, transmission, reception and processing of MPDUs, frames or packets. In some aspects, the MAC layer is configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some aspects, the processor 404 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 404, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
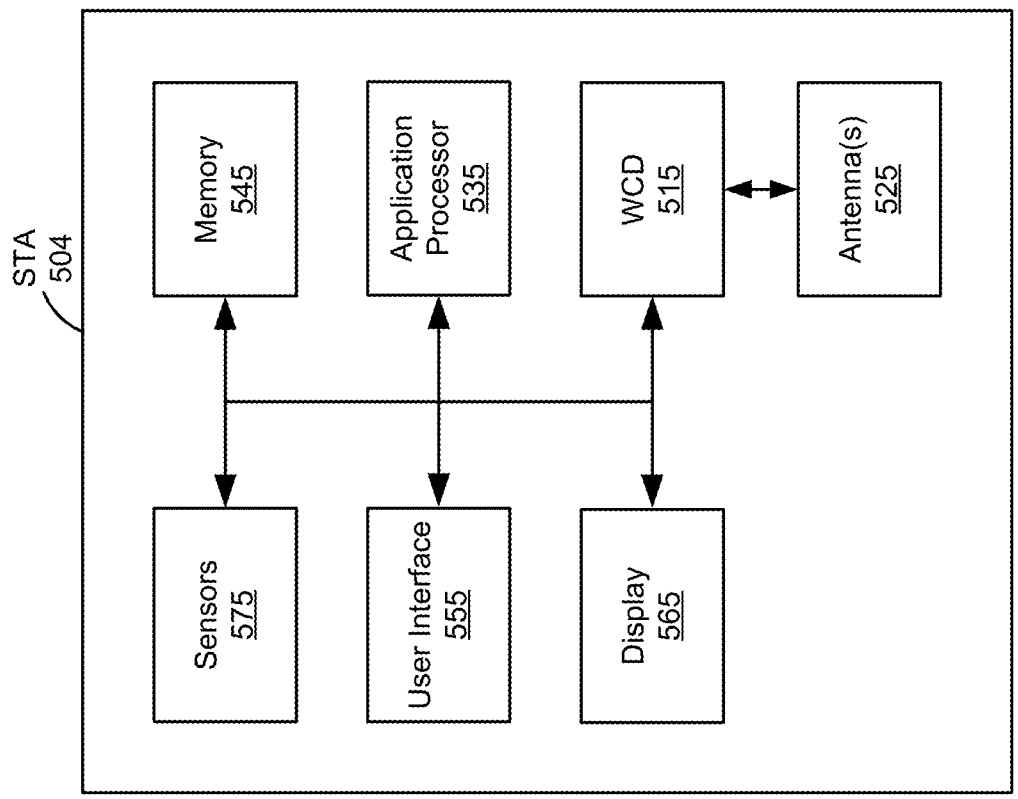
FIG. 5B shows a block diagram of an example STA, in accordance with some examples.
Figure 5A:
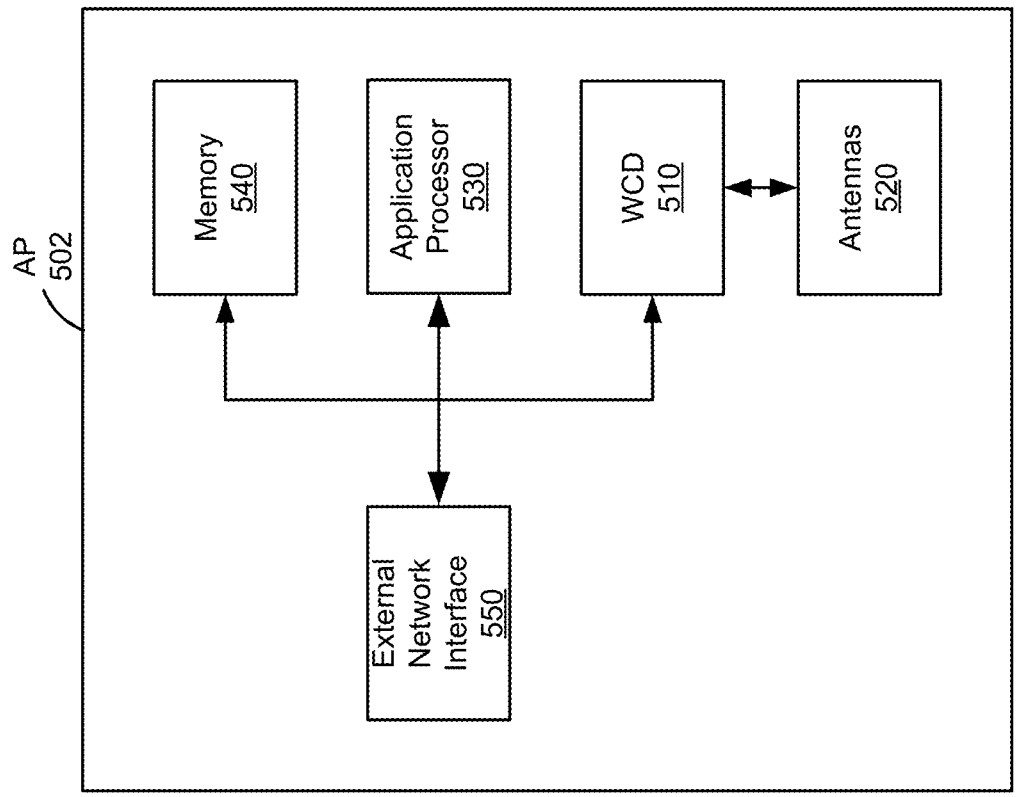
FIG. 5A shows a block diagram of an example AP, in accordance with some examples.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some aspects, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some aspects, the STA 504 further includes a user interface (UI) 555 (such as a touchscreen or keypad) and a display 565, which may be integrated with the UI 555 to form a touchscreen display. In some aspects, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, a frequency band, such as the 6.4 GHz, 5 GHz, or 6 GHz frequency bands, have channels defined within the frequency band. A communication protocol divides a frequency band into channels and each channel is identified by a distinct channel number (or identifier) that is assigned to a distinct, non-overlapping frequency range (for example bandwidth). Each channel may have a uniform bandwidth, such as 20 MHz, that is used to cover a total bandwidth associated with the frequency band. As described above, some WLAN devices are capable of transmitting at higher bandwidths by concurrently using multiple subchannels (referred to as "channel bonding"). By increasing the number of subchannels bonded into a channel, larger bandwidth channels (referred to as wide bandwidth channels) can be created. Such wide bandwidth channels can increase efficiency by limiting the signaling overhead and increasing the signaling efficiency. As channel bandwidth increases, the complexity of channel access and contention with other devices seeking access to the channel can increase. Larger channel bandwidths can lead to complexities both with limits on transmission power and fairness in sharing access to frequency band resources between different devices.

As noted previously, a wireless communication device can detect the energy of signals or noise on a channel (referred to as energy detection (ED)) to identify whether the channel is available for transmission, or, conversely, whether the channel is busy (or otherwise not available). For example, a wireless communication device can determine that the channel is busy if it detects energy on the channel that is greater than an energy detection (ED) Threshold (EDT). If the measured power is lower than the EDT, the wireless communication device identifies that the channel is available (thus identifying a transmission opportunity), and may perform transmission on the channel.

Figure 6:
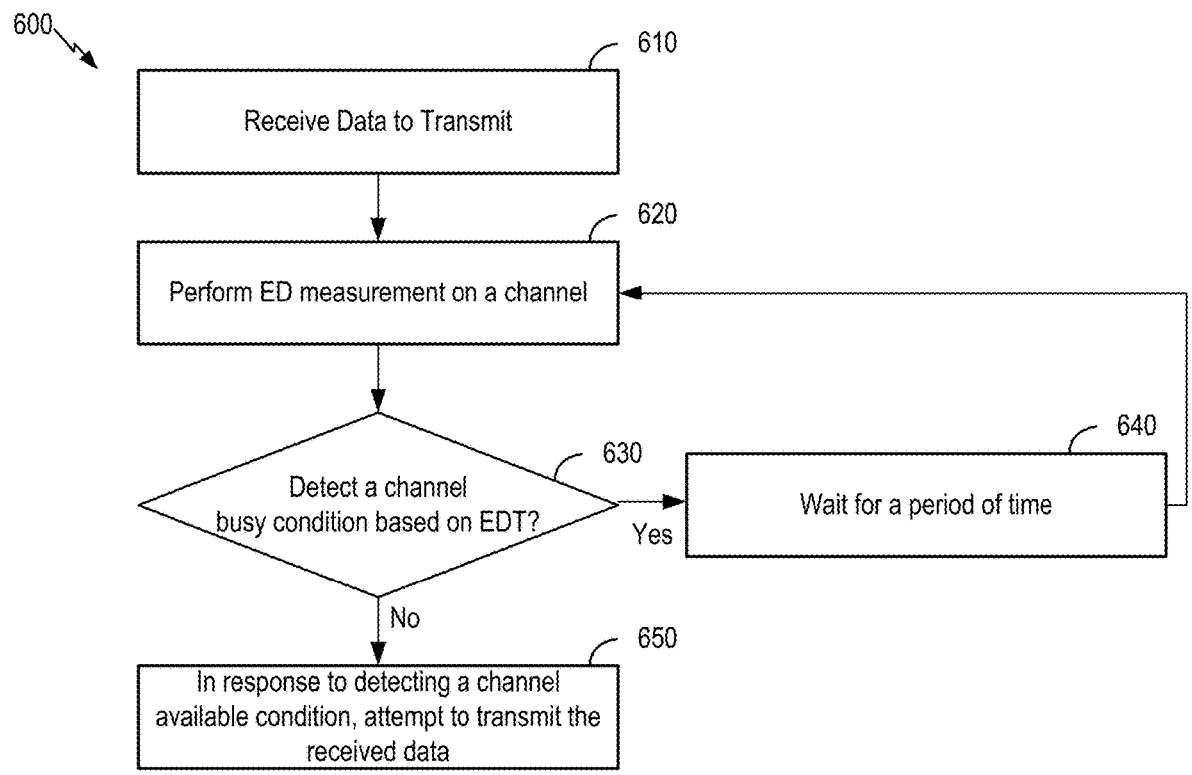
FIG. 6 shows a flowchart illustrating a process by a wireless communication device for identifying a transmission opportunity based on an energy detection (ED) threshold (EDT), in accordance with some examples.

FIG. 6 shows a flowchart illustrating a process 600 by a wireless communication device for identifying a transmission opportunity based on an EDT associated with the wireless communication device, in accordance with some examples. The example process 600 can be implemented by any wireless communication device such as a wireless STA or a wireless AP that transmits using a wireless communication protocol.

At block 610, the wireless communication device receives data to transmit from an upper layer and determines an allocated channel on which the wireless communication device is configured to transmit the data. The wireless communication device is configured to perform a power measurement on the allocated channel at block 620. For example, the wireless communication device can measure power of the channel by integrating the received power over the channel and dividing the integrated power by bandwidth (MHz), which results in normalization of the measured power to units of per-MHz of power. In some aspects, the wireless communication device can measure power of the channel at the interface between the device and the antenna.

At block 630, the wireless communication device determines if the measured power on the allocated channel is greater than the EDT associated with the wireless communication device. For example, a legacy wireless communication device uses a legacy EDT of −62 dBm/and determines if the measured power is greater than ~62 dBm. If the measured power is greater than the EDT of −62 dBm, the legacy wireless communication device detects a channel busy condition and waits for a period of time at block 640 and then returns to block 620 to continue measuring the channel. If the measured power is less than the legacy EDT of −62 dBm, the legacy wireless communication device detects a channel available condition (for example, an idle channel), starts a backoff process, and, if the channel remains idle during the backoff process, transmits the data on the channel at block 650.

As noted above, a wireless communication device that operates in the unlicensed band, such as using a 5G communications network, can implement a different mechanism to identify a transmission opportunity (as compared to the mechanism described with respect to FIG. 6), which can result in conflicts between different wireless communications devices operating using different communication technologies when accessing a channel in the unlicensed band. In some aspects, a conflict associated with accessing a channel using these different mechanisms may result in one device inadvertently suppressing transmissions of another device, causing the other device to defer transmission opportunities. There are proposals to amend or modify channel access mechanisms for different communication systems to reduce transmission suppression and improve access for devices to unlicensed frequency bands.

In some aspects, an non-legacy EDT has been proposed that provides different categories of operation. For example, a first category provides that, independent of the device's maximum transmit power ($P_H$), the EDT to identify a transmission opportunity is −62 dBm. A second category determines that the current EDT is proportional to $P_H$ as:

For $P_H \leq 13$ dBm: $EDT = -75$ dBm/MHz

For 13 dBm$<P_H<$23 dBm: $EDT = -85$ dBm/MHz$+(23$ dBm$-P_H)$

For $P_H \geq 23$ dBm: $EDT = -85$ dBm/MHz       (Equation 1)

For instance, an EDT can be based on an energy level on a 20 MHz channel. In one example, assuming that a device is transmitting using a transmit power ($P_H$) of 23 dBm, the −85 dBm/MHz shown above in Equation 1 multiplied by 20 MHz is equal to −72 dBm, which becomes the EDT for a 20 MHz channel. Using such an example, if $P_H$ is 23 dBm, the EDT for a 20 MHz channel becomes −85+13=−72 dBm.

The EDT levels are absolute and include any background noise from other signals on a corresponding channel. In some aspects, if a device is capable of operating in the first category or the second category, when changing operation from the second category to the first category, the device is not permitted to increase the EDT for a period of at least 60 seconds.

An non-legacy EDT allows a maximum power of −72 dBm for a channel, which is lower than the legacy EDT of −62 dBm. In some aspects, a legacy wireless communication device that operates using existing or legacy standards, such as IEEE 802.11b, IEEE 802.11n, and IEEE 802.11ac, is not subject to the non-legacy EDT. In some aspects, a wireless communication device that operates with the non-legacy EDT of −72 dBm will have to coexist with the legacy wireless communication device and the legacy EDT can impede attempts by the wireless communication device to access to the channel based on the 10 dB difference between the legacy EDT and non-legacy EDT. For example, the wireless communication device that operates with the non-legacy EDT requires at least 10 times less power on the channel to determine that the channel is available as compared to the legacy wireless communication device that operates with the legacy EDT. Based on the difference in the EDTs, the legacy wireless communication device that operates with the legacy EDT will be able to identify a channel that is available for transmission more frequently than the non-legacy wireless communication device that operates with the non-legacy EDT and can inadvertently suppress transmissions by the non-legacy wireless communication device that uses the non-legacy EDT.

Figure 7:
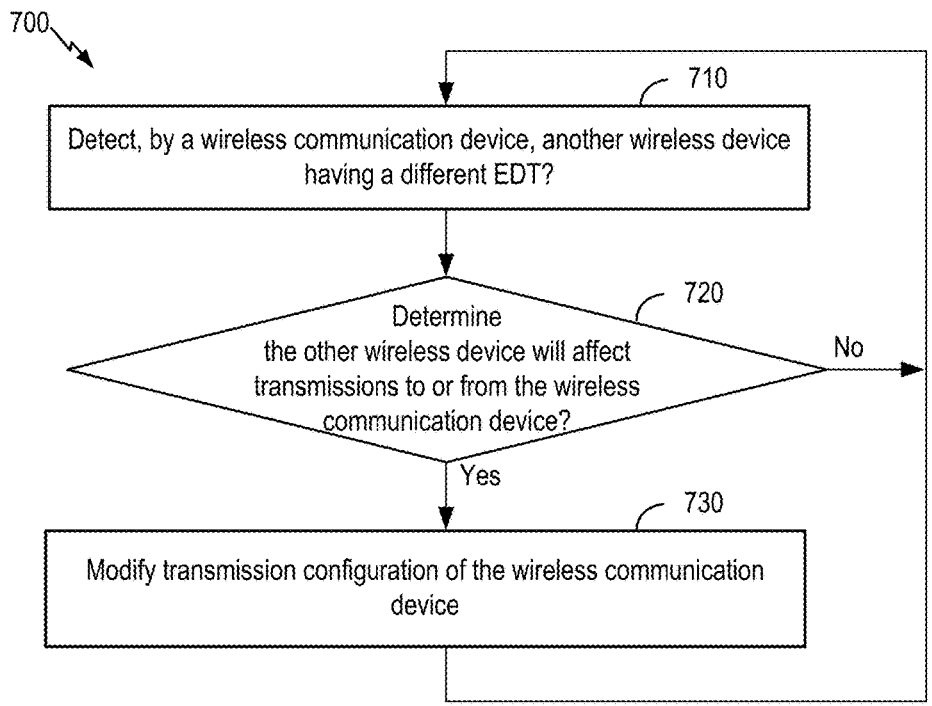
FIG. 7 shows a flowchart illustrating a process by a non-legacy wireless communication device for anticipating and preempting transmission deferral that can be caused by a legacy wireless communication device, in accordance with some examples.

FIG. 7 shows a flowchart illustrating a process 700 by a non-legacy wireless communication device for anticipating and preempting deferral of transmission opportunities of the non-legacy wireless communication device 810 that can be caused by a legacy wireless communication device in accordance with some examples. The example process 700 can be performed by any non-legacy wireless communication device such as a wireless STA or a wireless AP that transmits using a wireless communication protocol.

At block 710, the non-legacy wireless communication device can detect a legacy wireless communication device that operates with a legacy EDT that is different than an EDT used by the non-legacy wireless communication device. In some aspects, the non-legacy wireless communication device can operate with the non-legacy EDT described above or any other EDT that is different than the legacy EDT. In some aspects, the non-legacy wireless communication device can detect the legacy wireless communication device directly or indirectly. In some other aspects, the non-legacy wireless communication device can detect the legacy wireless communication device based on a beacon received from the legacy wireless communication device. For example, the non-legacy wireless communication device can receive a beacon from the legacy wireless communication device to detect the presence of the legacy wireless communication device based on information in the beacon. In some other aspects, the non-legacy wireless communication device can detect the legacy wireless communication device based on a beacon report received from an intermediary wireless communication device that receives a beacon or a probe response from the legacy wireless communication device. In some cases, the non-legacy wireless communication device can be configured to request the intermediary wireless communication device to identify the legacy wireless communication device. In some aspects, the non-legacy wireless communication device can detect the legacy wireless communication device based on detecting transmissions of the legacy wireless communication device. For example, a wireless communication device that uses the non-legacy EDT can directly or indirectly detect a presence of a legacy wireless communication device by sniffing a channel. As referred to herein, sniffing a channel refers to monitoring and analyzing each packet that is transmitted on the channel irrespective of intended recipient. The packets can be monitored (or sniffed) to identify packets transmitted by the legacy wireless communication device. In some aspects, the legacy wireless communication device can be within a communication range of the non-legacy wireless communication device and the non-legacy wireless communication device can detect the legacy wireless communication device based on signals received at and monitored by the non-legacy wireless communication device. In some other aspects, the legacy wireless communication device can be outside of the communication range and can be identified by an intermediary wireless communication device that monitors the channel for transmissions irrespective of the intended recipient of the transmission. Various aspects of detecting the legacy wireless communication device will be described herein with reference to FIG. 8A, FIG. 8B, FIG. 8C, FIG. 9A, FIG. 9B, FIG. 10A, FIG. 10B, FIG. 11A, FIG. 11B, FIG. 12A, and FIG. 12B.

At block 720, after detecting the legacy wireless communication device, the non-legacy wireless communication device can determine whether the legacy wireless communication device will affect transmissions to or from the non-legacy wireless communication device. For example, the legacy wireless communication device may be configured to transmit using a different channel than the non-legacy wireless communication device, in which case the non-legacy wireless communication device can determine that the legacy wireless communication device will not affect transmissions by the non-legacy wireless communication device. In some aspects, the legacy wireless communication device can be positioned outside of a communication range of the non-legacy wireless communication device and may not interfere with transmissions. In some other aspects, the non-legacy wireless communication device may be an AP that is associated with a STA and the STA may be positioned close to the legacy wireless communication device. In such aspects, the AP can determine that the legacy wireless communication device may affect transmissions from the STA to the AP.

In some aspects, the non-legacy wireless communication device can determine various properties of the legacy wireless communication device, such as a transmission power of the legacy wireless communication device, a path loss to the legacy wireless communication device, an estimated distance to the legacy wireless communication device, and so forth. The non-legacy wireless communication device can use the various parameters and determine whether the legacy wireless communication device will affect transmissions to or from the non-legacy wireless communication device. In another example, the non-legacy wireless communication device may determine (for example, based on a path loss) that there is a legacy wireless communication device in proximity to (for example, 2 meters away) the non-legacy wireless communication device. Because the legacy wireless communication device is in proximity to the non-legacy wireless communication device, the legacy wireless communication device will have a similar power measurement and may thus have more opportunities to access the channel based on its use of the legacy EDT, denying transmission opportunities available to the non-legacy wireless communication device If the non-legacy wireless communication device determines that the legacy wireless communication device will not affect transmissions to or from the non-legacy wireless communication device, the non-legacy wireless communication device can return to block 710 to continue detecting legacy wireless communication devices that have a different EDT. The non-legacy wireless communication device can continue the example process 700 to identify wireless communication devices that may affect transmissions to or from the non-legacy wireless communication device.

If the non-legacy wireless communication device does identify a wireless communication device that will affect transmissions to or from the non-legacy wireless communication device, the non-legacy wireless communication device can modify a transmission configuration to preempt the legacy wireless communication device from affecting (for example, suppressing) transmissions to or from the non-legacy wireless communication device at block 730. In some aspects, the non-legacy wireless communication device can modify the transmission configuration by identifying another channel that does not include a legacy wireless communication device that operates with the legacy EDT and, if the other channel is identified, switch to the other channel to preempt supression of transmission of transmission opportunities of the non-legacy wireless communication device that can be caused by the legacy EDT. In some other aspects, the non-legacy wireless communication device can modify the transmission configuration by reducing its transmission power for increased ED. In some other aspects, the non-legacy wireless communication device can modify the transmission configuration by switching to a conventional operating mode, such as 802.11ax, that uses the legacy EDT. Further aspects of modifying the transmission configuration will be described herein with reference to FIG. 14.

Figure 8A:
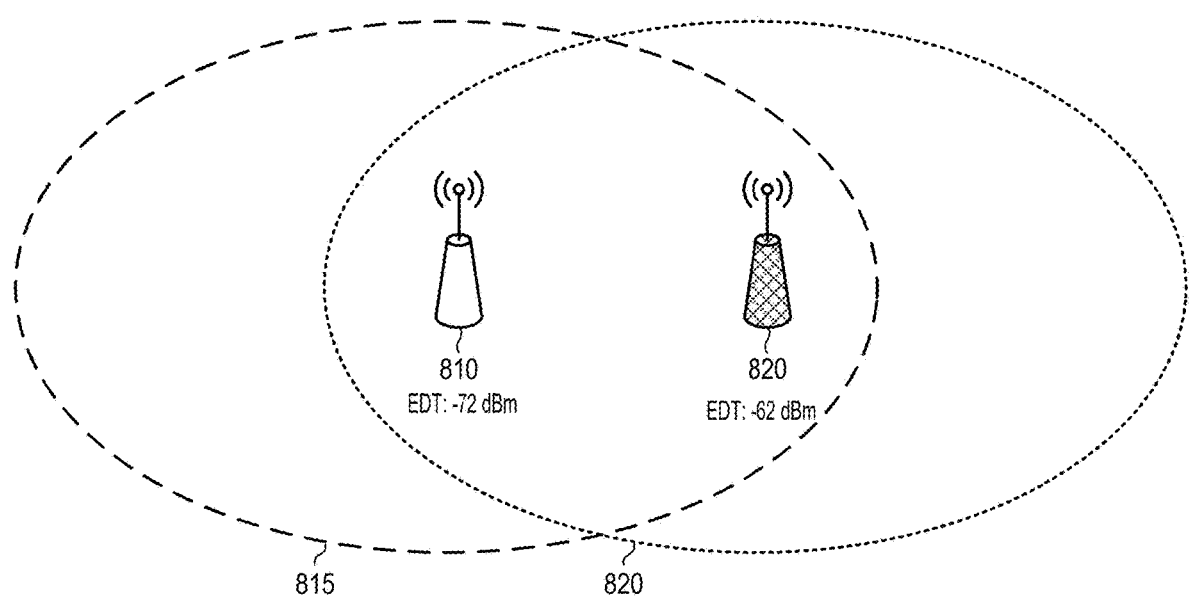
FIG. 8A shows an example of a non-legacy wireless communication device and a legacy wireless communication device, configured with a non-legacy EDT and a legacy EDT, respectively, that are in communication range of one another, in accordance with some examples.

FIG. 8A shows an example of a non-legacy wireless communication device 810 having an non-legacy EDT, in accordance with some examples. For purposes of illustration, the non-legacy EDT is shown in FIG. 8A as −72 dBm. However, other values for the non-legacy EDT can be used. The non-legacy wireless communication device 810 is configured to detect a legacy wireless communication device that is within a communication range of the non-legacy wireless communication 810 device based on one or more beacons. In some aspects, the non-legacy wireless communication device 810, is configured to transmit within a communication range 815. A legacy wireless communication device 820 having a legacy EDT, denoted as −62 dBm in FIG. 8A for illustrative purposes, is configured to transmit in a communication range 825 that overlaps a portion of the communication range 815. For purposes of illustration, wireless communication devices that use an non-legacy EDT, such as the non-legacy wireless communication device 810 in FIG. 8A, are illustrated throughout the figures without any fill pattern and wireless communication devices that use the legacy EDT, such as the legacy wireless communication device 820 in FIG. 8A, are illustrated throughout the figures with a fill pattern to visually distinguish between the devices and corresponding EDTs.

In some aspects, the legacy wireless communication device 820 is positioned within communication range 815 of the non-legacy wireless communication device 810 and can directly transmit and receive signals using various techniques such as a beacon, beacon report, direct association, or probes such as an 802.11k probe. In some aspects, although the non-legacy wireless communication device 810 and the legacy wireless communication device 820 are illustrated as APs, one or both of the non-legacy wireless communication device 810 and the legacy wireless communication device 820 could also be a STA.

Figure 8B:
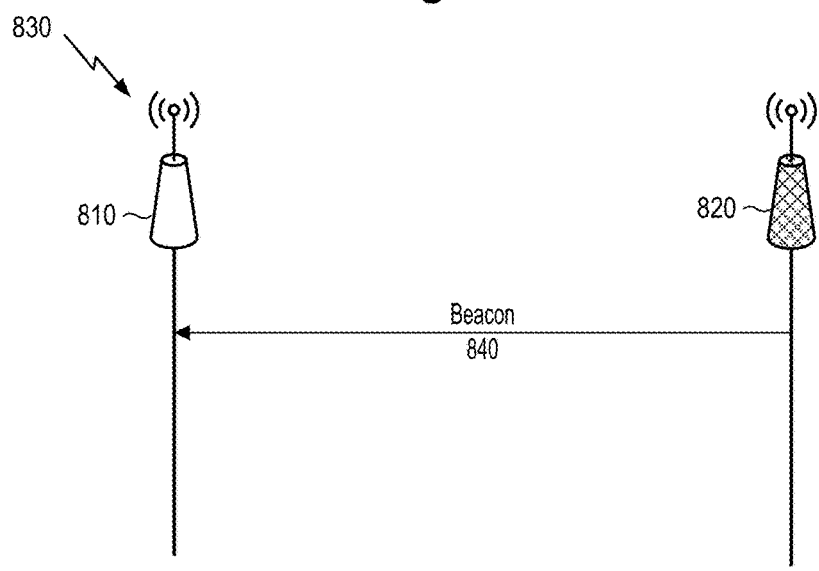
FIG. 8B shows an example of a sequence diagram illustrating the non-legacy wireless communication device of FIG. 8A detecting a legacy wireless communication device within communication range of the wireless communication device, in accordance with some examples.

FIG. 8B shows an example of a sequence diagram 830 illustrating the non-legacy wireless communication device 810 detecting the legacy wireless communication device of FIG. 8A in accordance with some examples. The non-legacy wireless communication device 810 can perform a beacon scan to monitor for beacons that are periodically transmitted by a neighboring wireless communication device to announce the presence of a WLAN. In some aspects, the non-legacy wireless communication device 810 can receive a beacon 840 transmitted by the legacy wireless communication device 820. The non-legacy wireless communication device 810 can generate a beacon report based on the beacon scan. The beacon report can includes information about the wireless communication device 820, such as BSSID, capability information, a measurement mode, measurement report modes, protocol information, MAC information, connection information, received signal power, transmission power, location configuration information, neighbor reports, and other relevant information. Based on the information in the beacon report, the non-legacy wireless communication device 810 can identify a transmission mode of the legacy wireless communication device and determine that the legacy wireless communication device 820 uses the legacy EDT. In some aspects, the beacon report can identify a frame format of a PPDU transmitted by the legacy wireless communication device 820. The non-legacy wireless communication device 810 can determine that the legacy wireless communication device 820 uses the legacy EDT based on the frame format of the PPDU. In some other aspects, the beacon report can include EDT information that explicitly identifies the EDT using a number that identifies a current EDT value, or an identifier that identifies a rule.

Figure 8C:
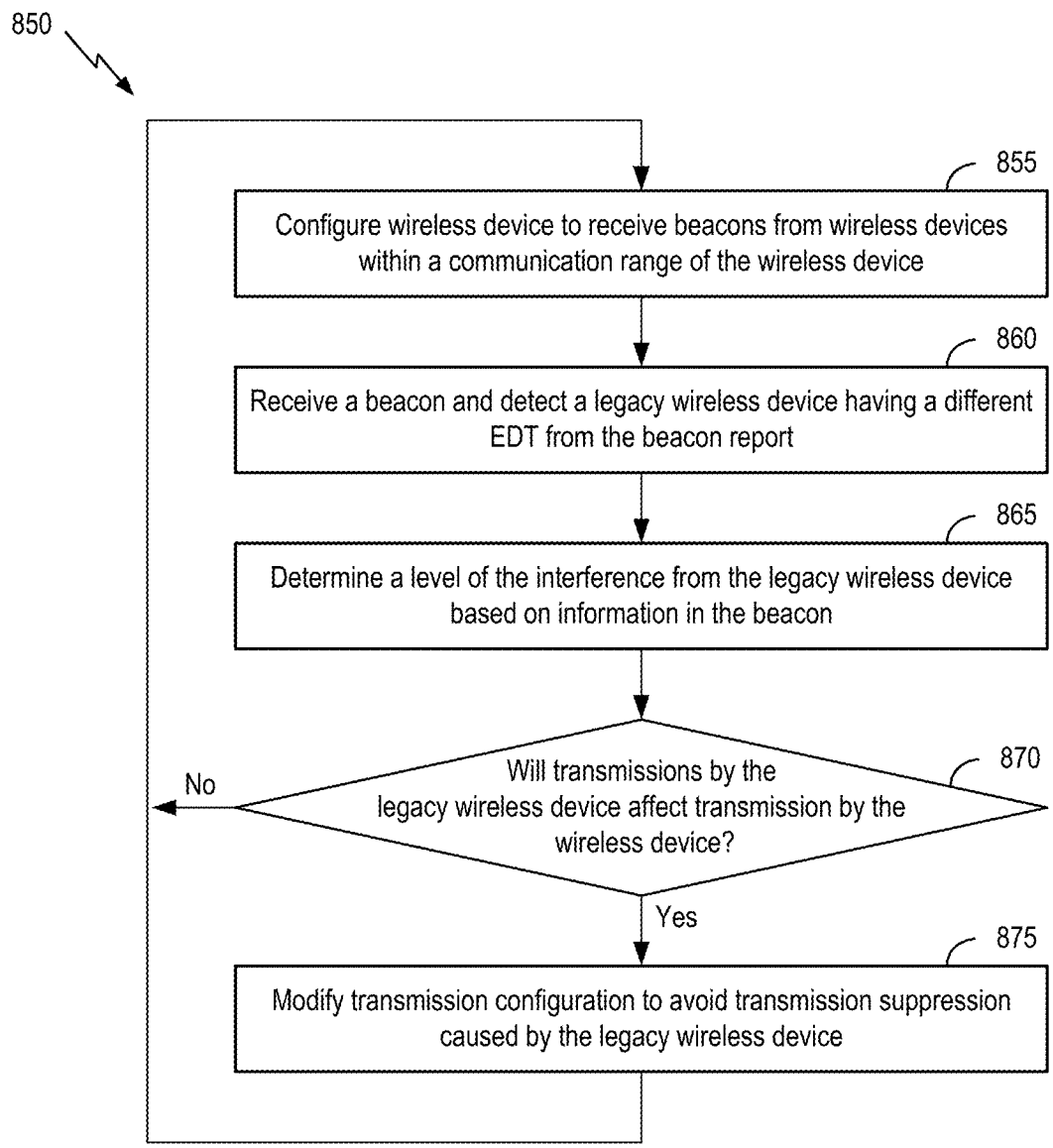
FIG. 8C shows a flowchart illustrating an example process by the non-legacy wireless communication device of FIG. 8A for anticipating and preempting transmission deferral that can be caused by the legacy wireless communication device of FIG. 8A, in accordance with some examples.

FIG. 8C shows a flowchart illustrating an example process 850 of the non-legacy wireless communication device 810 for anticipating and preempting deferral of transmission opportunities of the non-legacy wireless communication device 810 that can be caused by a legacy wireless communication device 820 in accordance with some examples. At block 855, the non-legacy wireless communication device 810 is configured to monitor for and receive beacons from other wireless communication devices within the communication range 815 of the non-legacy wireless communication device 810. At block 860, the non-legacy wireless communication device 810 receives a beacon and detects (based on the beacon) a legacy wireless communication device having a different EDT. In some aspects, the non-legacy wireless communication device 810 identifies that the wireless communication device uses a PPDU format associated with a communication protocol that uses the legacy EDT. In some aspects, a field or information element can be introduced to expressly indicate EDT-related information such as a counter, a binary flag, or more detailed information. For example, a beacon report generated by the non-legacy wireless communication device 810 based on the received beacon (and in some cases other received beacons received during the beacon scan) or a beacon report generated by another wireless communication device can include an information element that identifies the presence of the legacy wireless communication device 820. In some aspects, the information element can include a counter that identifies a number of legacy wireless communication devices or a bit that indicates the presence of at least one legacy wireless communication device.

In some aspects, at block 865, the wireless communication device can determine a transmission power of the legacy wireless communication device 820 and determine a path loss associated with the legacy wireless communication device 820 based on a transmit power indicator in the beacon. Using the path loss, the wireless communication device determines whether transmissions by the legacy wireless communication device 820 will affect transmissions by the non-legacy wireless communication device 810 at block 870. In some aspects, the non-legacy wireless communication device 810 may determine that the legacy wireless communication device 820 is far enough away from the non-legacy wireless communication device 810 that the corresponding transmissions by the legacy wireless communication device 820 will not affect communications by the non-legacy wireless communication device 810. Accordingly, the process 850 returns to block 865 to transmit a beacon scan at a later time.

If the non-legacy wireless communication device 810 determines that the legacy wireless communication device 820 will affect transmissions by the non-legacy wireless communication device 810, the non-legacy wireless communication device 810 at block 875 can modify a transmission configuration to preempt deferral of transmission opportunities to the non-legacy wireless communication device 810 caused by the legacy wireless communication device 820. Examples of modifying the transmission configuration are described herein. After modifying the transmission configuration, the process 850 returns to block 865 to perform a beacon scan at a later time. In some aspects, the non-legacy wireless communication device 810 can periodically execute the process 850 to continually monitor for legacy wireless communication devices that may affect transmissions by the non-legacy wireless communication device 810.

Figure 9A:
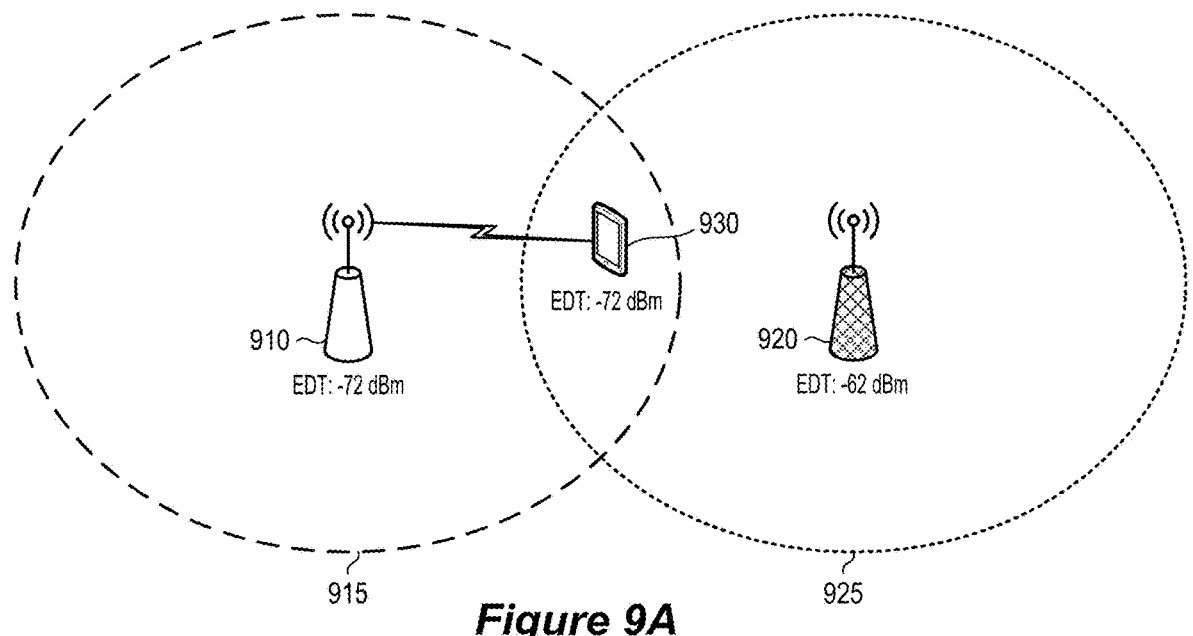
FIG. 9A show shows an example of a non-legacy wireless communication device and a legacy wireless communication device, configured with a non-legacy EDT and a legacy EDT, respectively, that are out of communication range from one another, in accordance with some examples.

FIG. 9A show shows an example of a non-legacy wireless communication device 910 having an non-legacy EDT, in accordance with some examples. For purposes of illustration, the non-legacy EDT is shown in FIG. 9A as −72 dBm. However, other values for the non-legacy EDT can be used. The non-legacy wireless communication device 910 is configured to detect a legacy wireless communication device 920 that is out of communication range of the non-legacy wireless communication device 910 in accordance with some examples. In some aspects, a non-legacy wireless communication device 910 having the non-legacy EDT, denoted as −72 dBm for purposes of illustration, is configured to transmit within a communication range 915. A legacy wireless communication device 920 having a legacy EDT, denoted as −62 dBm in FIG. 9A for illustrative purposes, is configured to transmit in a communication range 925 that overlaps a portion of the communication range 915.

The communication range 915 and the communication range 925 partially overlap. However, the non-legacy wireless communication device 910 is outside of communication range 925 of the legacy wireless communication device 920 and thus cannot directly detect the legacy wireless communication device 920. In some aspects, an intermediary wireless communication device 930 associated with the non-legacy wireless communication device 910 can be positioned in an overlapping region of the communication range 915 and the communication range 925. In some aspects, the non-legacy wireless communication device 910 can request the intermediary wireless communication device 930 to perform a beacon scan to identify neighbor devices with which the non-legacy wireless communication device 910 is unable to directly communicate. In some aspects, the intermediary wireless communication device 930 can perform a beacon scan by passively monitoring for beacons or can use an active probe, such as an 802.11k probe, to identify the legacy wireless communication device 920.

Figure 9B:
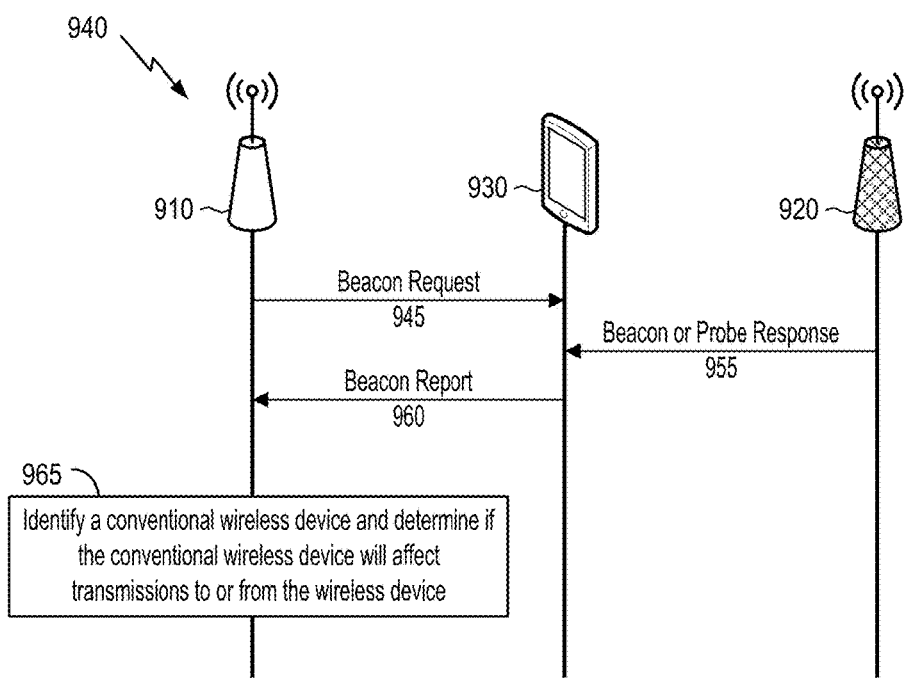
FIG. 9B shows an example of a sequence diagram illustrating the non-legacy wireless communication device of FIG. 9A indirectly detecting the legacy wireless communication device using an intermediary wireless communication device, in accordance with some examples.

FIG. 9B shows an example of a sequence diagram 940 illustrating the non-legacy wireless communication device 910 indirectly detecting the legacy wireless communication device 920 using an intermediary wireless communication device 930 in accordance with some examples. As described above, the intermediary wireless communication device 930 is located in an overlapping region of the communication range 915 and the communication range 925 and can communicate with both the non-legacy wireless communication device 910 and the legacy wireless communication device 920. The non-legacy wireless communication device 910 transmits a beacon request 945 to the intermediary wireless communication device 930. In response to receiving the beacon request 945, the intermediary wireless communication device 930 performs a beacon scan. The intermediary wireless communication device 930 listens for beacon or probe responses from devices within a corresponding communication range, such as a beacon or probe response 955 from the legacy wireless communication device 920. The intermediary wireless communication device 930 generates a beacon report 960 based on received beacons or probe responses (for example, the beacon or probe response 955 from the legacy wireless communication device 920. The intermediary wireless communication device 930 transmits the beacon report 960 to the non-legacy wireless communication device 910. In some aspects, the beacon report 960 can be a collection of beacon reports generated by the intermediary wireless communication device 930. In some other aspects, the intermediary wireless communication device 930 can extract relevant information for the non-legacy wireless communication device 910 and include the relevant information in the beacon report 960.

The non-legacy wireless communication device 910 receives the beacon report 960. Based on information in the beacon report 960, the non-legacy wireless communication device 910 can identify the legacy wireless communication device 920 that is outside of the communication range 915 of the non-legacy wireless communication device 910 at block 965. In some aspects, the non-legacy wireless communication device 910 may determine if the legacy wireless communication device 920 will affect transmissions to or from the non-legacy wireless communication device 910 at block 965. For example, the legacy wireless communication device 920 may be close enough to the intermediary wireless communication device 930 to cause deferral of transmission opportunities of the intermediary wireless communication device 930 based on the different EDTss. In this case, the legacy wireless communication device 920 cannot deferral transmission opportunities of the non-legacy wireless communication device 910 because the legacy wireless communication device 920 is not within the communication range 915 of the intermediary non-legacy wireless communication device 910.

Figure 10A:
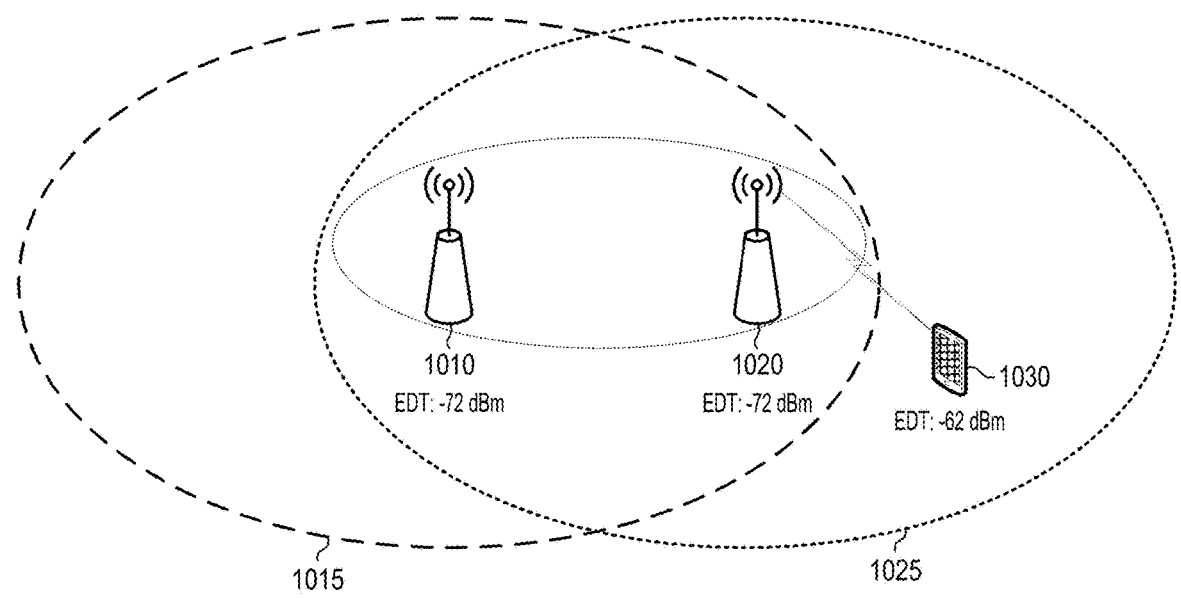
FIG. 10A shows an example of a non-legacy wireless communication device and a legacy wireless communication device, configured with a non-legacy EDT and a legacy EDT, respectively, and an intermediary wireless communication device that is in communication range of the non-legacy wireless communication device and the legacy wireless communication device, in accordance with some examples.

FIG. 10A shows an example of a non-legacy wireless communication device 1010 having an non-legacy EDT, in accordance with some examples. For purposes of illustration, the non-legacy EDT is shown in FIG. 10A as −72 dBm. However, other values for the non-legacy EDT can be used. The non-legacy wireless communication device 1010 is configured to detect a legacy wireless communication device 1030 through an intermediary wireless communication device 1020. In some aspects, the non-legacy wireless communication device 1010 having the non-legacy EDT is configured to transmit within a communication range 1015. The wireless communication device 1020, which also operates using the non-legacy EDT of −72 dBm, is configured to transmit in a communication range 1025 that overlaps a portion of the communication range 1015. The wireless communication device 1020 has an associated legacy wireless communication device 1030 that uses the legacy EDT, denoted as −62 dBm in FIG. 10A for illustrative purposes.

In some aspects, the legacy wireless communication device 1030 is out of the communication range 1015 of the non-legacy wireless communication device 1010, in which case the non-legacy wireless communication device 1010 cannot identify the legacy wireless communication device 1030. The intermediary wireless communication device 1020 can generate a beacon with information indicating that the legacy wireless communication device 1030 is associated with the intermediary wireless communication device 1020. In some aspects, the beacon can include a counter that identifies a quantity of legacy wireless communication devices that are associated with the wireless communication device 1020 or can include a Boolean flag (for example, a bit) that indicates the presence of at least one legacy wireless communication device associated with the wireless communication device 1020. While performing a beacon scan, the non-legacy wireless communication device 1010 can receive and read the beacon from the intermediary wireless communication device 1020. The device 1010 can then identify that the legacy wireless communication device 1030 is nearby based on the information in the beacon (for example, the Boolean flag or counter).

Figure 10B:
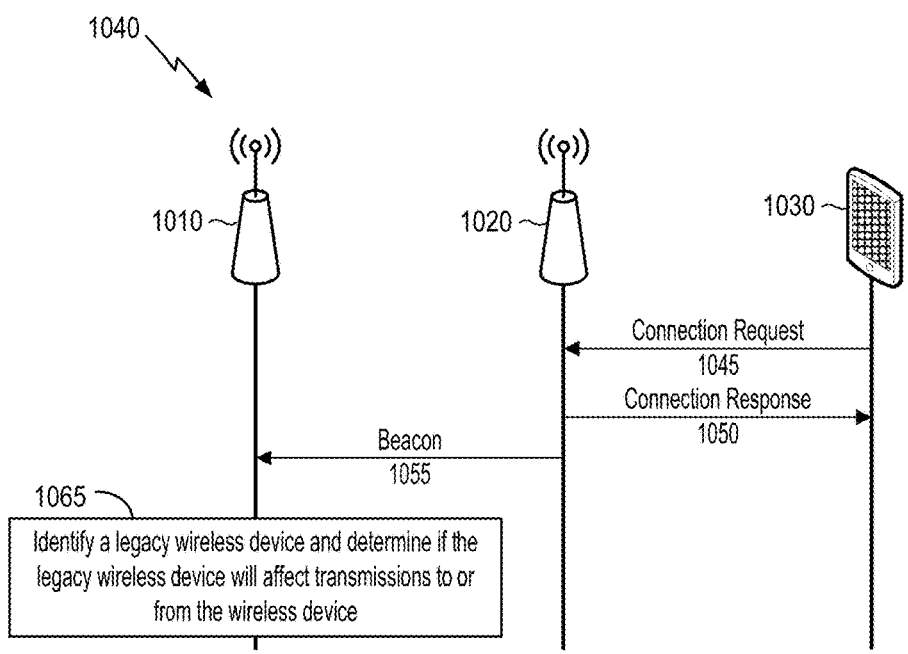
FIG. 10B shows an example of a sequence diagram illustrating the non-legacy wireless communication device of FIG. 10A indirectly detecting the legacy wireless communication device based on coordination with the intermediary wireless communication device of FIG. 10A, in accordance with some examples.

FIG. 10B shows an example of a sequence diagram 1040 illustrating the non-legacy wireless communication device 1010 detecting the legacy wireless communication device 1030 based on information (for example, a Boolean flag or counter as described above) from a beacon from the wireless communication device 1020. In some aspects, the non-legacy wireless communication device 1010 may identify that the wireless communication device 1020 is configured to use the non-legacy EDT based on a prior beacon (not shown). The legacy wireless communication device 1030 may transmit a connection request 1045 to the wireless communication device 1020 to set up a connection to the wireless communication device 1020. In response to the connection request 1045, the wireless communication device 1020 identifies the legacy wireless communication device 1030. The connection setup process illustrated by connection request 1045 and the connection response 1050 may require additional signaling and is simplified for purposes of illustration. After configuring the connection with the legacy wireless communication device 1030, the wireless communication device 1020 transmits a beacon 1055 that is received by the non-legacy wireless communication device 1010. The beacon 1055 can include a Boolean flag such as a single bit that identifies that at least one legacy wireless communication device (including the legacy wireless communication device 1030) is associated with the non-legacy wireless communication device 1010, a counter that identifies a quantity of associated legacy wireless communication devices, or a more detailed field that provides additional information to the non-legacy wireless communication device 1010.

In some aspects, the non-legacy wireless communication device 1010 receives the beacon 1055 and identifies the legacy wireless communication device 1030 that is associated with the wireless communication device 1020. Based on information from the beacon 1055 that is related to the legacy wireless communication device 1030, the non-legacy wireless communication device 1010 can determine that the legacy wireless communication device 1030 may enter the communication range 1015 of the non-legacy wireless communication device 1010. In some aspects, the non-legacy wireless communication device 1010 can determine if the legacy wireless communication device 1030 will affect transmissions to or from the non-legacy wireless communication device 1010 at block 1065. For example, the legacy wireless communication device 1030 may be near another device that is connected to the non-legacy wireless communication device 1010 and may suppress transmissions from the other device to the non-legacy wireless communication device 1010 based on the use of the legacy EDT by the legacy wireless communication device 1030.

Figure 11A:
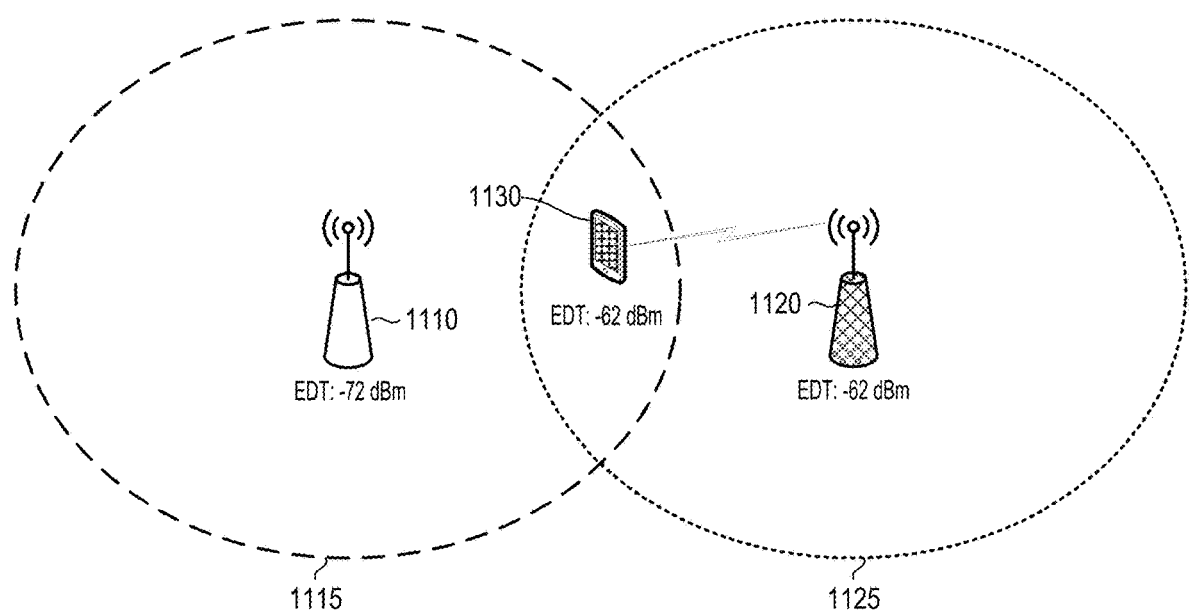
FIG. 11A shows an example of a non-legacy wireless communication device and two legacy wireless communication devices, configured with a non-legacy EDT and legacy EDTs, respectively, with one of the legacy wireless communication devices being out of communication range of the non-legacy wireless communication device and in communication range of the other legacy wireless communication device, in accordance with some examples.

FIG. 11A shows an example of a non-legacy wireless communication device 1110 having an non-legacy EDT, in accordance with some examples. For purposes of illustration, the non-legacy EDT is shown in FIG. 11A as −72 dBm. However, other values for the non-legacy EDT can be used. The non-legacy wireless communication device 1110 is configured to detect transmissions of a legacy wireless communication device 1120 that is within communication range of the non-legacy wireless communication device 1110. The non-legacy wireless communication device 1110 having the non-legacy EDT is configured to transmit within a communication range 1115. The legacy wireless communication device 1120 operates according to a legacy EDT, denoted in FIG. 11A as −62 dBm for illustrative purposes. The legacy wireless communication device 1120 is configured to transmit in a communication range 1125 that overlaps a portion of the communication range 1115.

In some aspects, the intermediary legacy wireless communication device 1130 is associated with the legacy wireless communication device 1120 and is positioned in an overlapping region of the communication range 1115 and the communication range 1125. The intermediary legacy wireless communication device 1130 may be incapable of performing an 802.11k beacon scan. The non-legacy wireless communication device 1110 may be unaware of the presence of the intermediary legacy wireless communication device 1130. The non-legacy wireless communication device 1110 may be able to directly identify the intermediary legacy wireless communication device 1130 based on sniffing packets received at the non-legacy wireless communication device 1110. As noted above, sniffing a channel or packets refers to monitoring and analyzing each packet that is transmitted on the channel irrespective of intended recipient. The packets can be monitored (or sniffed) to identify packets transmitted by the legacy wireless communication device 1120.

Figure 11B:
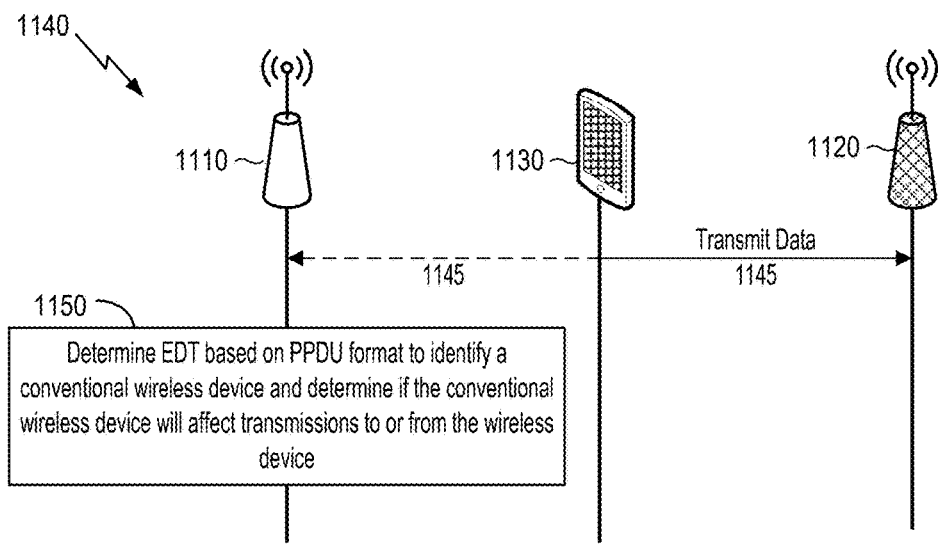
FIG. 11B shows an example of a sequence diagram illustrating the non-legacy wireless communication device of FIG. 11A detecting one of the legacy wireless communication devices of FIG. 11A based on sniffing packets transmitted by the other legacy wireless communication device of FIG. 11A, in accordance with some examples.

FIG. 11B shows an example of a sequence diagram 1140 illustrating the non-legacy wireless communication device 1110 detecting the legacy wireless communication device 1130 based on sniffing packets in accordance with some examples. In some aspects, the intermediary legacy wireless communication device 1130 may transmit data 1145 on a channel to the legacy wireless communication device 1120. The non-legacy wireless communication device 1110 may be within a communication range of the intermediary legacy wireless communication device 1130 and may therefore also receive the data based on sniffing for packets on the channel.

At block 1150, the non-legacy wireless communication device 1110 can sniff the channel and determine that the legacy wireless communication device 1120 is a legacy device that uses the legacy EDT based on a PPDU format of a PPDU transmitted by the legacy wireless communication device 1120 on the channel. Based on determining that the legacy wireless communication device 1120 uses the legacy EDT, the non-legacy wireless communication device 1110 can determine that the legacy wireless communication device 1120 will affect transmissions to or from the non-legacy wireless communication device 1110. In some aspects, the non-legacy wireless communication device 1110 can analyze a preamble of the PPDU and content of the preamble, such as one or more training fields in the preamble. In some aspects, the non-legacy wireless communication device 1110 can determine a communication mode of the legacy wireless communication device 1120 (for example, a communication mode according to 802.11ax, 802.11ac, or 802.11n, etc.) based on the contents in the preamble and can determine the EDT of the legacy wireless communication device 1120 based on the communication mode. The non-legacy wireless communication device 1110 can also determine other aspects based on the training fields, such as channel loss, an estimated distance to the intermediary legacy wireless communication device 1130.

Figure 12A:
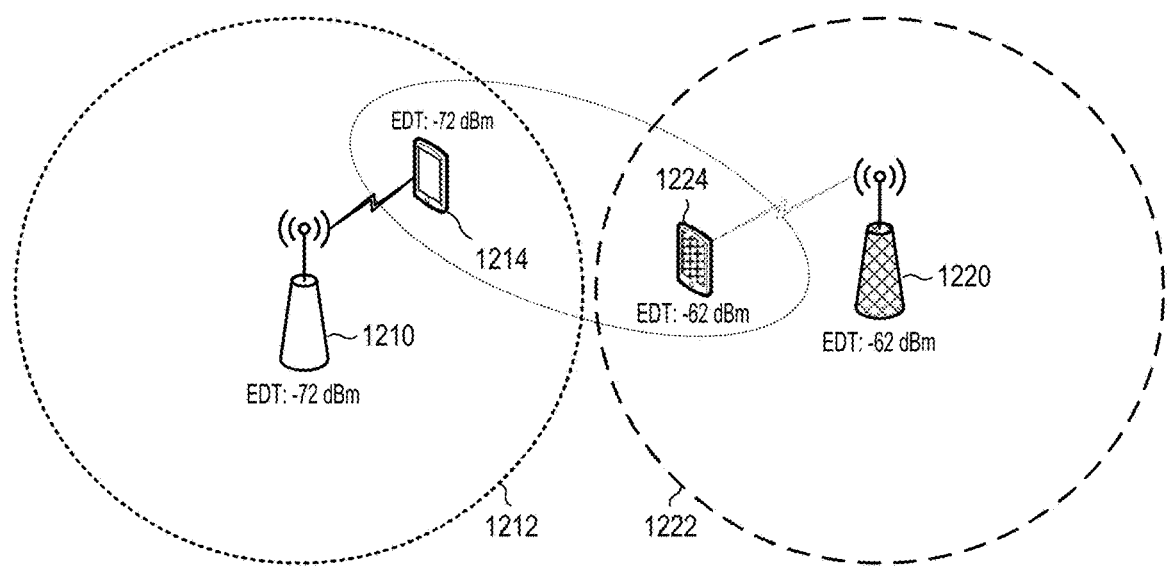
FIG. 12A shows an example of non-legacy wireless communication devices and legacy wireless communication devices, configured with non-legacy EDTs and legacy EDTs, respectively, with one of the non-legacy wireless communication devices being in communication range of one of the legacy wireless communication devices, in accordance with some examples.

FIG. 12A shows an example of a non-legacy wireless communication device 1210 having an non-legacy EDT, in accordance with some examples. For purposes of illustration, the non-legacy EDT is shown in FIG. 12A as −72 dBm. However, other values for the non-legacy EDT can be used. The non-legacy wireless communication device 1210 is configured to detect transmissions of a legacy wireless communication device 1220 that is outside a communication range of the non-legacy wireless communication device 1210. In some aspects, a non-legacy wireless communication device 1210 having the non-legacy EDT is configured to transmit within a communication range 1212 and is associated with a non-legacy wireless communication device 1214. The legacy wireless communication device 1220 having a legacy EDT, denoted in FIG. 12A as −62 dBm for illustrative purposes, is configured to transmit in a communication range 1222 and has an associated legacy wireless communication device 1224. The communication range 1222 does not overlap with the communication range 1212 and the legacy wireless communication device 1224 is positioned outside of the communication range 1212.

The non-legacy wireless communication device 1214 can be configured to monitor the EDT of other wireless communication devices and inform the non-legacy wireless communication device 1210 of potential suppression of transmissions by the non-legacy wireless communication device 1210 that may be caused by the other wireless communication devices (for example, based on the other wireless communication devices using the legacy EDT). In some aspects, the non-legacy wireless communication device 1214 can be configured to sniff packets transmitted from the legacy wireless communication device 1224 and report the presence of the legacy wireless communication device 1224 to the non-legacy wireless communication device 1210.

Figure 12B:
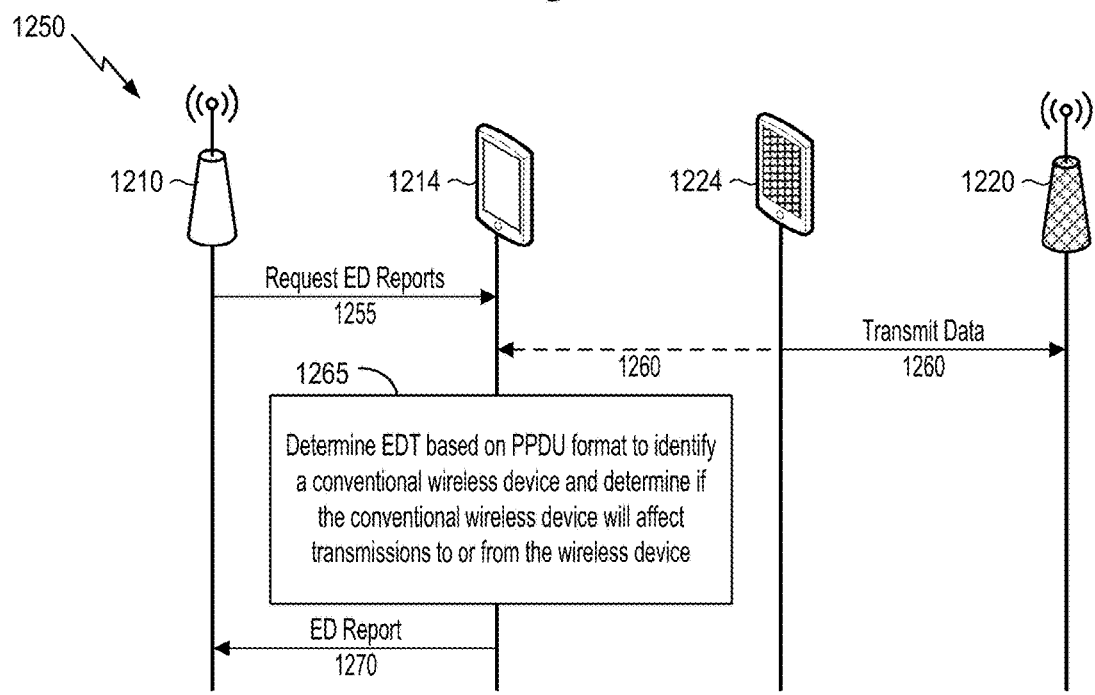
FIG. 12B shows an example of a sequence diagram illustrating one of the non-legacy wireless communication devices of FIG. 12A detecting one of the legacy wireless communication devices of FIG. 12A by configuring the other non-legacy wireless communication device to sniff packets of the other legacy wireless communication device, in accordance with some examples.

FIG. 12B shows an example of a sequence diagram 1250 illustrating the non-legacy wireless communication device 1214 detecting potential deferral of transmission opportunities of the non-legacy wireless communication device 1210 caused by the legacy wireless communication device 1224 by sniffing packets in accordance with some examples. In some examples, the non-legacy wireless communication device 1210 may transmit a request for ED reports 1255 to the non-legacy wireless communication device 1214 requesting that the non-legacy wireless communication device 1214 provides ED reports identifying potential transmission suppression of transmissions to the non-legacy wireless communication device 1210. Based on receiving the request for ED reports 1255, the non-legacy wireless communication device 1214 proactively monitors for potential suppression of transmissions by periodically sniffing one or more channels for transmissions from the wireless communication device 1224. In some cases, the non-legacy wireless communication device 1214 can sniff for transmissions periodically or sniff for transmissions based on a condition such as frequent transmission suppression by one or more legacy wireless communication devices or transmission deferrals by one or more non-legacy wireless communication devices.

In some aspects, the legacy wireless communication device 1224 may transmit data 1260 to the legacy wireless communication device 1220. Because the non-legacy wireless communication device 1214 is within the communication range of the legacy wireless communication device 1224, the non-legacy wireless communication device 1214 may sniff the data 1260 and make determinations based on content of the data 1260 (for example, based on a preamble of the PPDU, based on a PPDU format of the PPDU, etc.). For example, based on the data 1260 (for example, based on the PPDU format of the data 1260), the non-legacy wireless communication device 1110 can determine at block 1150 that the legacy wireless communication device 1120 is a legacy device that uses the legacy EDT and thus that the legacy wireless communication device 1224 may affect transmissions to or from the non-legacy wireless communication device 1110. In some aspects, the non-legacy wireless communication device 1110 can analyze a preamble of the PPDU and content of the preamble, such as one or more training fields. In some aspects, the non-legacy wireless communication device 1214 can determine a communication mode of the legacy wireless communication device 1120 (for example, a communication mode according to 802.11ax, 802.11ac, 802.11n, etc.) based on the contents in the preamble and can determine the EDT based on the communication mode. The non-legacy wireless communication device 1214 can also determine other aspects based on the training fields, such as channel loss, an estimated distance to the legacy wireless communication device 1224, etc. In some aspects, the operations at block 1265 may be performed at a different wireless communication device, such as non-legacy wireless communication device 1210.

Based on the analysis at block 1265, the non-legacy wireless communication device 1214 can send an ED report 1270 to the non-legacy wireless communication device 1210. In some aspects, the ED report 1270 can include information related to suppression of transmissions by one or more legacy wireless communication device or deferral of transmission opportunities by one or more non-legacy wireless communication device. For example, the ED report can identify that the legacy wireless communication device 1224 is causing suppression of transmissions by the non-legacy wireless communication device 1214. In other aspects, the ED report 1270 can be or include a collection of beacon reports, information related to transmissions and missed transmission opportunities, information related to other wireless communication devices outside of the communication range 1212 of the non-legacy wireless communication device 1210, etc. Based on information in the ED report 1270, the non-legacy wireless communication device 1210 can anticipate suppression of transmissions and can modify transmission configurations to preempt deferral of such transmissions, as described herein.

Figure 13:
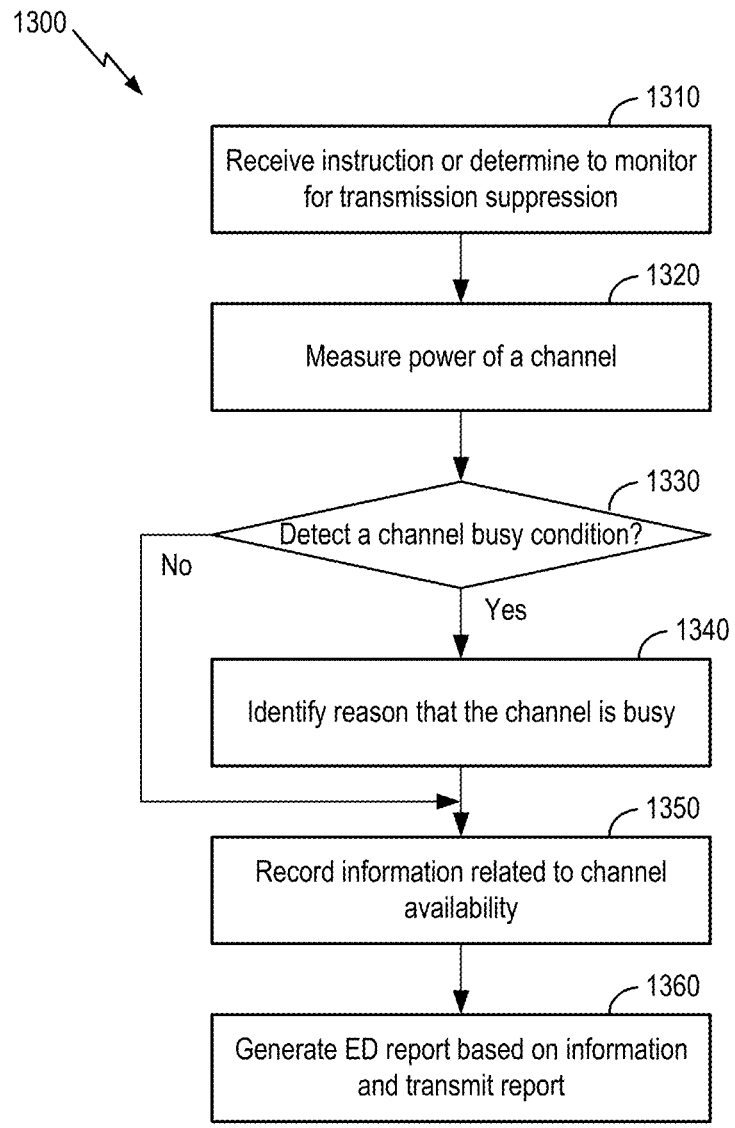
FIG. 13 shows an example process by a STA for providing ED reports to a wireless AP that is configured to anticipate and preempt transmission deferral, in accordance with some examples.

FIG. 13 shows an example process 1300 illustrated by a STA for providing ED reports to a wireless AP in accordance with some examples. In some aspects, the STA may proactively monitor wireless communications to ascertain if there is a potential for suppression of transmissions to the STA by one or more other wireless communication devices and report information regarding the transmission suppression to the AP.

Initially, the STA may either receive an instruction or determine to monitor for transmission suppression at 1310. In some aspects, an AP may instruct the STA to provide ED reports. In some other aspects, the STA can monitor for transmission suppression by one or more other wireless communication devices when the STA forms a connection with the AP. At block 1320, the STA may measure power of a channel. The STA can measure the power based on data that needs to be transferred. In some other aspects, the STA may periodically measure the power of the channel at a point in time even if the STA is not planning to transmit data is to the AP at that point in time.

At block 1330, the STA may detect if the channel is busy (and therefore unavailable to the STA for transmitting information) based on the measured power and the EDT. If the channel is busy, the STA can identify a reason why the channel is busy (or unavailable) at block 1340. In some aspects, a nearby legacy wireless communication device that uses the legacy EDT can transmit on the channel and the STA can sniff the packets to identify the device, as described herein. In some aspects, the STA can determine another non-WLAN device is transmitting on the channel, as described herein.

After identifying the reason that the channel is busy/unavailable at block 1340, or after not detecting a channel busy condition at block 1330, the STA records information related to channel availability at block 1350. In some cases, the information can include the reason the channel is unavailable. The information can be used to derive metrics and other information that can be used by the AP to reduce transmission suppression caused by legacy wireless communication devices that use the legacy EDT. At block 1360, the STA can generate an ED report based on the information related to channel availability and transmit the ED report. In some aspects, the ED report can expressly identify legacy wireless communication devices that are frequently transmitting on the channel and causing the STA to determine that the channel is unavailable. The ED report can also include information related to devices within a communication range of the STA. In some aspects, the ED report can expressly identify that the transmission opportunities are frequently being denied based on devices having a relaxed EDT.

Figure 14:
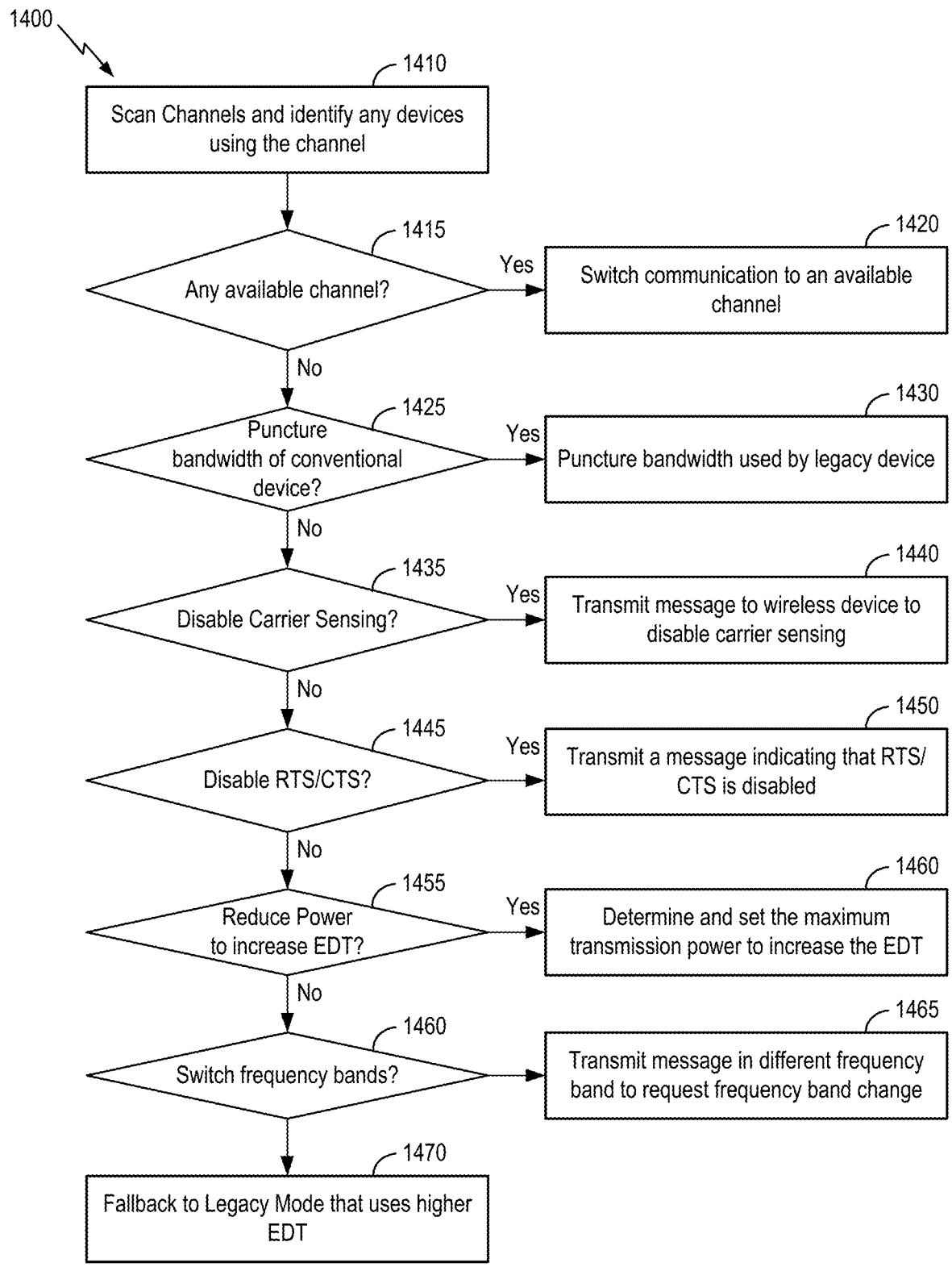
FIG. 14 shows a process of a wireless communication device to modify a transmission configuration and preempt transmission deferral by another wireless communication device, in accordance with some examples.

FIG. 14 shows a process 1400 of a non-legacy wireless communication device to modify a transmission configuration to reduce transmission suppression by another wireless communication device in accordance with some examples. The process 1400 illustrates various mitigation measures that a wireless communication device such as a STA or an AP can implement to anticipate and preempt transmission suppression and can be modified to include additional functions, or can be modified to exclude one or more functions. In some aspects, the process 1400 can perform some or all of the operations illustrated by blocks 1415, 1425, 1435, 1445, 1455, 1460, 1465, and 1470 in any order, or can exclude some of the blocks 1415, 1425, 1435, 1445, 1455, 1460, 1465, and 1470 in some cases.

Initially, the process 1400 may scan channels of a frequency band at block 1410 and identify any potential devices that are communicating using the channels. In some aspects, the devices using a channel can be identified from beacon scans or beacon reports. In some other aspects, the devices cannot be identified because the devices are implementing a different communication scheme. At block 1415, the non-legacy wireless communication device determines if any channel is available based on excluding any legacy wireless communication device that does not implement an non-legacy EDT. If at least one channel is determined to be available at block 1415, the non-legacy wireless communication device can switch communication to an available channel at block 1420.

If there are not any available channels at block 1415, the non-legacy wireless communication device can determine whether to use preamble puncturing to skip a bandwidth used by a legacy wireless communication device at block 1425 or to switch frequency bands. In some aspects, the non-legacy wireless communication device may be transmitting on a channel bandwidth of 80 MHz or 160 MHz and the legacy wireless communication device may be transmitting on a 20 MHz channel. The non-legacy wireless communication device may determine whether the channel of the legacy wireless communication device can be excluded from its channel bandwidth so that the legacy wireless communication device does not suppress transmissions by the non-legacy wireless communication device. If the bandwidth used by the legacy wireless communication device can be punctured, the non-legacy wireless communication device punctures the bandwidth and excludes any channel or channels associated with the legacy wireless communication device at block 1430.

If the bandwidth cannot be punctured at block 1425, the non-legacy wireless communication device can determine whether to disable carrier sensing and transmit in data and acknowledge configuration at block 1435. In some aspects, the non-legacy wireless communication device can be configured to transmit based on various triggers that require the non-legacy wireless communication device to perform carrier sensing, and configuring a different transmission mode would allow the non-legacy wireless communication device to transmit irrespective of ED. If carrier sensing can be disabled at block 1435, the non-legacy wireless communication device transmits a message to another device to switch into a different communication mode that disables carrier sensing at block 1440.

If carrier sensing cannot be disabled at block 1435, the non-legacy wireless communication device can determine whether to disable request to send (RTS)/clear to send (CTS) at block 1445. If the non-legacy wireless communication device can disable RTS/CTS because there are no hidden frames, the non-legacy wireless communication device can transmit a message to an associated wireless communication device that informs that RTS/CTS is disabled at block 1450.

If RTS/CTS cannot be disabled at block 1445, the non-legacy wireless communication device can determine whether reducing maximum transmission power will increase the EDT. In some cases, when an associated wireless communication device is proximate to the non-legacy wireless communication device, by reducing the maximum transmission power, the EDT can increase transmission opportunities. If the non-legacy wireless communication device can reduce power at block 1455, the non-legacy wireless communication device determines and sets the maximum transmission power to increase the EDT at block 1460.

In some aspects, the non-legacy wireless communication device can initiate transfer to a different frequency band, such as from 5 GHz to 2.4 GHz, based on determining that one or more alternative channels are unavailable, based on an inability of the non-legacy wireless communication device to reduce transmission power, or based on other factors. For example, at block 1460, if the transmission power cannot be reduced at block 1465, the non-legacy wireless communication device can determine whether to switch frequency bands. When the non-legacy wireless communication device determines to switch frequency bands, the non-legacy wireless communication device transmits a message in a different frequency band requesting to communicate in the different frequency band at block 1465.

If the non-legacy wireless communication device determines to not switch frequency bands at block 1460, the non-legacy wireless communication device can fall back to a legacy mode that uses a relaxed EDT such as the legacy EDT. In some aspects, a wireless communication device communicating in 802.11be can fall back to 802.11ax and use the legacy EDT at block 1470.

Additionally or alternatively, signaling and modification of various reports may be applied to communication protocols to implement the various aspects described above. In some cases, Table 1 below illustrates existing IEs in beacons and probe responses that can be extended to incorporate functionality described above.

TABLE 1

| Description | Octets |
| --- | --- |
| Operating class | 1 |
| Channel Number | 1 |

TABLE 1-continued

| Description | Octets |
| --- | --- |
| Randomization Interval | 2 |
| Measurement duration | 2 |
| Measurement mode | 1 |
| BSSID | 6 |
| Optional subelements | variable |

The optional subelements in Table 1 are further described in Table 2 and include a beacon reporting detail value. In some aspects, if the reporting detail is 1 in the beacon report and the optional request subelement is included in the beacon request, the corresponding beacon report shall include a list of elements listed in the beacon request.

TABLE 2

| Subelement ID | Name | Extensible |
| --- | --- | --- |
| 0 | SSID | No |
| 1 | Beacon Reporting | Yes |
| 2 | Reporting Detail | Yes |
| 3-9 | Reserved | |
| 10 | Request | No |
| 11 | Extended Request | No |
| 12-50 | Reserved | |

In some aspects, the beacon request may be modified to request the EHT operation element identifier (ID) in a beacon request. If the beacon report to an accepted beacon request does not contain EHT operation element, the corresponding AP is determined to be an EHT AP. In some cases, a wireless communication device may allow a beacon scan to obtain information on whether any pre-802.11be client is associated with an 802.11be AP.

The optional subelements in Table 1 are further described in Table 2 and include a beacon reporting detail value that is further illustrated below in Table 3. In some aspects, if the reporting detail is 1 in the beacon report and the optional request subelement is included in the beacon request, the corresponding beacon report shall include the list of elements listed in the request.

TABLE 3

| Level of detail requested | Reporting Detail |
| --- | --- |
| No fixed-length fields or elements | 0 |
| All fixed-length fields and any requested elements in the Request element if present | 1 |
| All fixed length fields and elements (default, used when Reporting entail subelement is not included in aBeacon request) | 2 |
| Reserved | 3-255 |

In some aspects, a wireless communication device may use a channel load report or request a channel load report to request a report on presence and impact from wireless communication devices or non-WLAN devices. In some aspects, Table 4 below illustrates a channel load request that a wireless communication device may receive or request that includes an optional subelements field that is further illustrated in Table 5.

TABLE 4

| Description | Octets |
| --- | --- |
| Operating class | 1 |
| Channel Number | 1 |
| Randomization Interval | 2 |
| Measurement duration | 2 |
| Optional subelements | variable |

TABLE 5

| Subelement ID | Name | Extensible |
| --- | --- | --- |
| 0 | Reserved | |
| 1 | Channel Load Reporting | Yes |
| 2-162 | Reserved | |
| 163 | Wide Bandwidth Switch Channel | Yes |
| 164-220 | Reserved | |

In some aspects, the non-legacy wireless communication device may detect if a reporting wireless communication device such as a STA is suffering due to an non-legacy EDT. In some aspects, a new subelement may be defined in the option subelements illustrated in Table 5 using a current reserved value such as the subelement ID 2.

The new subelement may be defined to solicit a report with an indication of whether an associated non-legacy wireless communication device is being caused to defer transmission opportunities, a current EDT of the associated wireless communication device, ED information including a frequency of how often ED is triggered, and other pertinent information related to other devices. In some cases, the ED information may include a further detail regarding various other aspects such as intra-BSS (InBSS), OBSS, wireless communication devices that use a legacy EDT such at pre-802.11be STAs and pre-802.11be APs, and so forth. In some cases, the non-legacy wireless communication device using the non-legacy EDT can estimate potential impact due to reduced ED and source of impact based on the ED information.

Figure 15:
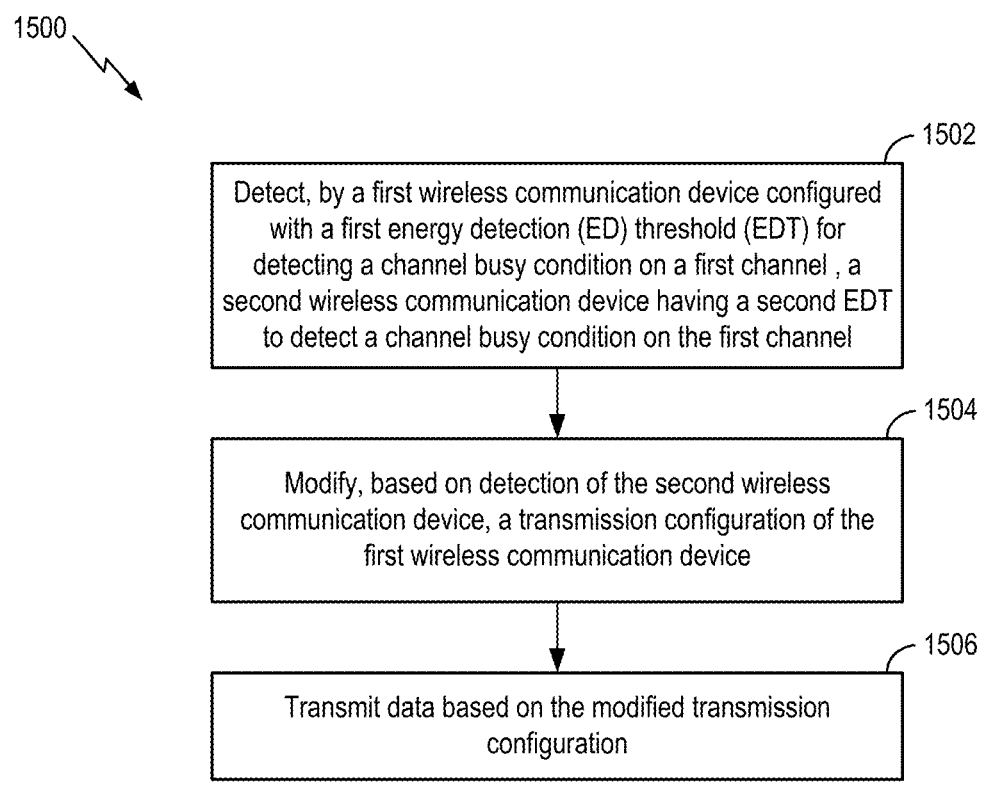
FIG. 15 shows an example process for wireless communication by a first wireless communication device having a first EDT to detect a channel busy condition on a first channel, in accordance with some examples.

FIG. 15 shows a flowchart illustrating an example process 1500 that supports wireless communication by a first wireless communication device having a first energy detection (ED) threshold (EDT) to detect a channel busy condition on a first channel. The process 1500 may be performed by a wireless communication device such as a non-legacy wireless communication device described above with reference to any of the Figures described above (for example, the non-legacy wireless communication device 810 of FIG. 8, the non-legacy wireless communication device 910 of FIG. 9, or other non-legacy wireless communication device described herein). In some implementations, the process 1500 may be performed by a wireless communication device operating as or within a STA, such as one of the STAs 104 described above with reference to FIG. 1.

In some implementations, in block 1502, the wireless communication device detects a second wireless communication device configured with a second EDT for detecting a channel busy condition on the first channel. The second EDT is greater than the first EDT. In some aspects, the first EDT is based on a transmission power of the first wireless communication device, and wherein the second EDT is a fixed value. In some implementations, detecting the second wireless communication device is based on one or more beacon reports, a beacon scan, at least one of a basic service set (BSS) color, a received signal strength indication (RSSI), a media access control (MAC) address, BSS identifier (BSSID), any combination thereof, and/or other factors.

In some implementations, to detect the second wireless communication device, the wireless communication device obtains a beacon report that indicates a presence of the second wireless communication device. In some aspects, the beacon report includes a binary value indicating the presence of the second wireless communication device. In such implementations, the wireless communication device can detect or identify the second wireless communication device based on the binary value. In some cases, the beacon report includes a counter value identifying a number of wireless communication devices configured with the second EDT. In such implementations, the wireless communication device can detect or identify the second wireless communication device based on the counter value.

In some implementations, to detect the second wireless communication device, the wireless communication device transmits a request to a third wireless communication device (for example, intermediary wireless communication device 930 of FIG. 9A) that is wirelessly connected with the first wireless communication device. In some aspects, the wireless communication device can perform a beacon scan. The wireless communication device can receive the beacon report from the third wireless communication device based on performing the beacon scan.

In some implementations, the wireless communication device determines a transmission power of the second wireless communication device based on information in the beacon report. In some aspects, the wireless communication device determines that one or more transmissions by the second wireless communication device affect or suppress transmission by the first wireless communication device based on the transmission power of the second wireless communication device. The wireless communication device can detect the second wireless communication device based on the determination that one or more transmissions by the second wireless communication device affect or suppress transmission by the first wireless communication device.

In some implementations, the wireless communication device performs a beacon scan to identify wireless communication devices within a wireless communication range of the first wireless communication device.

In some implementations, to detect the second wireless communication device, the wireless communication device receives, from the second wireless communication device on the first channel, a physical layer protocol data unit (PPDU). The wireless communication device can identify a format of the PPDU and can determine the second EDT based on the format of the PPDU.

In some implementations, to detect the second wireless communication device, the wireless communication device transmits a message to a third wireless communication device (e.g., intermediary legacy wireless communication device 1130 of FIG. 11A) that is wirelessly connected with the first wireless communication device. The message indicates to the third wireless communication device to sniff for packets from other wireless communication devices within a wireless communication range of the third wireless communication device. In some aspects, the wireless communication device receives a report from the third wireless communication device. The report includes information indicating a presence of the second wireless communication device.

In some implementations, in block 1504, the wireless communication device modifies a transmission configuration of the first wireless communication device based on the detection of the second wireless communication device. In some aspects, to modify the transmission configuration, the wireless communication device switches from communicating on the first channel to communicating on a second channel. In some aspects, to modify the transmission configuration, the wireless communication device transmits a trigger frame on the first channel that does not require a responding device to consider a medium state or a network allocation vector in determining whether or not to respond to the trigger frame. In some implementations, to modify the transmission configuration, the wireless communication device may be configured to switch from using the first EDT to using the second EDT for detecting a channel busy condition. In some aspects, to modify the transmission configuration, the wireless communication device may be configured to reduce a transmission power of the first wireless communication device based on a received signal strength indication (RSSI) from the second wireless communication device.

In some implementations, in block 1506, the wireless communication device transmits data based on the modified transmission configuration. In some aspects, to transmit the data based on the modified transmission configuration, the wireless communication device transmits the data without first transmitting a request to send (RTS) message.

In some implementations, the first channel is associated with a first frequency band. In some aspects, to modify the transmission configuration, the wireless communication device identifies that a second channel of the first frequency band is unavailable for transmitting the data. In some aspects, in block 1506, the wireless communication device transmits the data using a channel of a second frequency band that is different from the first frequency band based on identifying that the second channel is unavailable for transmitting the data.

In some implementations, to modify the transmission configuration, the wireless communication device performs a preamble puncturing operation to avoid transmission using a first bandwidth configured for use by the second wireless communication device. In some aspects, in block 1506, the wireless communication device may transmit the data using a second bandwidth based on the preamble puncturing operation.

Figure 16:
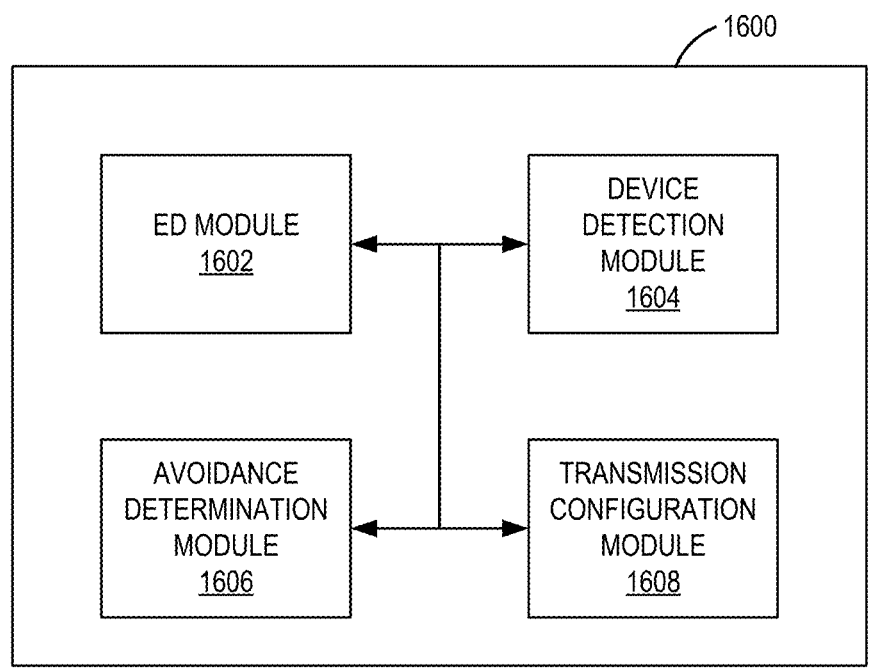
FIG. 16 shows a block diagram of an example wireless communication device configured to anticipate and preempt transmission deferral that can be caused by a legacy wireless communication device, in accordance with some examples.

FIG. 16 shows a block diagram of an example non-legacy wireless communication device 1600 configured to preempt transmission deferral by the non-legacy wireless communication device 1600 caused by a legacy wireless communication device according to some examples. While operations of the non-legacy wireless communication device 1600 are described with respect to EDT in an unlicensed band, the techniques described can be applied to other techniques and communication systems. In some aspects, the non-legacy wireless communication device 1600 is configured to perform one or more of the processes described above. The processes can include the process 600 of FIG. 6, process 700 of FIG. 7, the process illustrated in sequence diagram 830 of FIG. 8B, process 850 of FIG. 8C, the process illustrated in sequence diagram 940 of FIG. 9B, the process illustrated in sequence diagram 1040 of FIG. 10B, the process illustrated in sequence diagram 1140 of FIG. 11B, the process illustrated in sequence diagram 1250 of FIG. 12B, process 1300 of FIG. 13, and process 1400 of FIG. 14, as well as any other process described herein. The non-legacy wireless communication device 1600 may be an example aspect of the non-legacy wireless communication device 400 described above with reference to FIG. 4. For example, the non-legacy wireless communication device 1600 can be a chip, SoC, chipset, package or device that includes at least one modem (for example, a Wi-Fi (IEEE 802.11) modem or a cellular modem such as the modem 402), at least one processor (such as the processor 404), at least one radio (such as the radio 406) and at least one memory (such as the memory 408). In some aspects, the non-legacy wireless communication device 1600 can be a device for use in a STA, such as one of the STAs 104 and 504 described above with reference to FIGS. 1 and 5B, respectively. In some other aspects, the non-legacy wireless communication device 1600 can be a STA that includes such a chip, SoC, chipset, package or device as well as at least one antenna (such as the antennas 525).

The non-legacy wireless communication device 1600 may include an ED module 1602, a device detection module 1604, an avoidance determination module 1606, and a transmission configuration module 1608. Portions of one or more of the modules 1602, 1604, 1606, and 1608 may be implemented at least in part in hardware or firmware. For example, each of the ED module 1602, the device detection module 1604, the avoidance determination module 1606, and the transmission configuration module 1608 may be implemented at least in part by one or more modems (for example, a Wi-Fi (IEEE 802.11) modem). In some aspects, at least some of the modules 1602, 1604, 1606, and 1608 are implemented at least in part as software stored in a memory. For example, portions of one or more of the modules 1602, 1604, 1606, and 1608 can be implemented as non-transitory instructions (or "code") executable by at least one processor to perform the functions or operations of the respective module.

In some aspects, the ED module 1602 may be configured to perform ED based on different EDTs and based on a communication mode presently used by the non-legacy wireless communication device 1600. The device detection module 1604 may be configured to detect devices either directly or indirectly by receiving beacon reports or by detecting transmissions directly or indirectly. The device detection module 1604 can determine whether any detected device may defer transmissions by the non-legacy wireless communication device 1600 based on different EDTs. The avoidance determination module 1606 may be configured to perform a process to determine how to preempt the transmission deferral by the non-legacy wireless communication device 1600 that is caused by the detected devices based on the different EDTs. The transmission configuration module 1608 may be configured to reconfigure transmission by the non-legacy wireless communication device 1600 to prevent the transmission deferral by the non-legacy wireless communication device 1600.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations and algorithm processes described in connection with the aspects disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the aspects described in this disclosure may be readily apparent to persons having ordinary skill in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Various features that are described in this specification in the context of separate aspects also can be implemented in combination in a single aspect. Conversely, various features that are described in the context of a single aspect also can be implemented in multiple aspects separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

Illustrative aspects of the present disclosure include:

Aspect 1: A method for wireless communication by a first wireless communication device configured with a first energy detection (ED) threshold (EDT) for detecting a channel busy condition on a first channel, comprising: detecting a second wireless communication device configured with a second EDT for detecting a channel busy condition on the first channel, the second EDT being greater than the first EDT; modifying, based on the detection of the second wireless communication device, a transmission configuration of the first wireless communication device; and transmitting data based on the modified transmission configuration.

Aspect 2: The method of Aspect 1, wherein the first EDT is based on a transmission power of the first wireless communication device, and wherein the second EDT is a fixed value.

Aspect 3: The method of any of Aspects 1 to 2, wherein detecting the second wireless communication device comprises: obtaining a beacon report that indicates a presence of the second wireless communication device.

Aspect 4: The method of Aspect 3, wherein the beacon report includes a binary value indicating the presence of the second wireless communication device.

Aspect 5: The method of Aspect 3, wherein the beacon report includes a counter value identifying a number of wireless communication devices configured with the second EDT.

Aspect 6: The method of any of Aspects 3 to 5, wherein detecting the second wireless communication device comprises: transmitting a request to a third wireless communication device, wirelessly connected with the first wireless communication device, to perform a beacon scan, wherein the beacon report is received from the third wireless communication device based on the beacon scan.

Aspect 7: The method of any of Aspects 3 to 5, wherein detecting the second wireless communication device comprises: determining a transmission power of the second wireless communication device based on information in the beacon report; and determining that one or more transmissions by the second wireless communication device affect transmission by the first wireless communication device based on the transmission power of the second wireless communication device, the detection of the second wireless communication device being based on the determination that one or more transmissions by the second wireless communication device affect transmission by the first wireless communication device.

Aspect 8: The method of any of Aspects 1 to 7, further comprising: performing a beacon scan to identify wireless communication devices within a wireless communication range of the first wireless communication device.

Aspect 9: The method of any of Aspects 1 to 8, wherein detecting the second wireless communication device is based on at least one of a basic service set (BSS) color, a received signal strength indication (RSSI), a media access control (MAC) address, or a BSS identifier (BSSID).

Aspect 10: The method of any of Aspects 1 to 9, wherein detecting the second wireless communication device comprises: receiving, from the second wireless communication device on the first channel, a physical layer protocol data unit (PPDU); identifying a format of the PPDU; and determining the second EDT based on the format of the PPDU.

Aspect 11: The method of any of Aspects 1 to 10, wherein detecting the second wireless communication device comprises: transmitting a message to a third wireless communication device, wirelessly connected with the first wireless communication device, that indicates to the third wireless communication device to sniff for packets from other wireless communication devices within a wireless communication range of the third wireless communication device; and receiving a report, from the third wireless communication device, that includes information indicating a presence of the second wireless communication device.

Aspect 12: The method of any of Aspects 1 to 11, wherein modifying the transmission configuration comprises: switching from communicating on the first channel to communicating on a second channel.

Aspect 13: The method of any of Aspects 1 to 12, wherein modifying the transmission configuration comprises: transmitting a trigger frame on the first channel that does not require a responding device to consider a medium state or a network allocation vector in determining whether or not to respond to the trigger frame.

Aspect 14: The method of any of Aspects 1 to 13, wherein transmitting the data based on the modified transmission configuration comprises: transmitting the data without first transmitting a request to send (RTS) message.

Aspect 15: The method of any of Aspects 1 to 14, wherein the first channel is associated with a first frequency band and wherein: modifying the transmission configuration comprises identifying that a second channel of the first frequency band is unavailable for transmitting the data; and transmitting the data includes transmitting the data using a channel of a second frequency band that is different from the first frequency band based on identifying that the second channel is unavailable for transmitting the data.

Aspect 16: The method of any of Aspects 1 to 15, wherein: modifying the transmission configuration comprises performing a preamble puncturing operation to avoid transmission using a first bandwidth configured for use by the second wireless communication device; and transmitting the data comprises transmitting the data using a second bandwidth based on the preamble puncturing operation.

Aspect 17: The method of any of Aspects 1 to 16, wherein modifying the transmission configuration comprises: switching from using the first EDT to using the second EDT for detecting a channel busy condition.

Aspect 18: The method of any of Aspects 1 to 17, wherein modifying the transmission configuration comprises: reducing a transmission power of the first wireless communication device based on a received signal strength indication (RSSI) from the second wireless communication device.

Aspect 19: A wireless communication device configured with a first energy detection (ED) threshold (EDT) for detecting a channel busy condition on a first channel, comprising: at least one modem; at least one processor communicatively coupled with the at least one modem; and at least one memory communicatively coupled with the at least one processor and storing processor-readable code that, when executed by the at least one processor in conjunction with the at least one modem, is configured to: detect a second wireless communication device configured with a second EDT for detecting a channel busy condition on the first channel, the second EDT being greater than the first EDT; modify, based on the detection of the second wireless communication device, a transmission configuration of the first wireless communication device; and transmit data based on the modified transmission configuration.

Aspect 20: The wireless communication device of Aspect 19, wherein the first EDT is based on a transmission power of the first wireless communication device, and wherein the second EDT is a fixed value.

Aspect 21: The wireless communication device of any of Aspects 19 to 20, wherein, to detect the second wireless communication device, the processor-readable code, when executed by the at least one processor in conjunction with the at least one modem, is configured to: obtain a beacon report that indicates a presence of the second wireless communication device.

Aspect 22: The wireless communication device of Aspect 21, wherein the beacon report includes a binary value indicating the presence of the second wireless communication device.

Aspect 23: The wireless communication device of Aspect 21, wherein the beacon report includes a counter value identifying a number of wireless communication devices configured with the second EDT.

Aspect 24: The wireless communication device of any of Aspects 21 to 23, wherein, to detect the second wireless communication device, the processor-readable code, when executed by the at least one processor in conjunction with the at least one modem, is configured to: transmit a request to a third wireless communication device, wirelessly connected with the first wireless communication device, to perform a beacon scan, wherein the beacon report is received from the third wireless communication device based on the beacon scan.

Aspect 25: The wireless communication device of any of Aspects 21 to 23, wherein, to detect the second wireless communication device, the processor-readable code, when executed by the at least one processor in conjunction with the at least one modem, is configured to: determine a transmission power of the second wireless communication device based on information in the beacon report; and determine that one or more transmissions by the second wireless communication device affect transmission by the first wireless communication device based on the transmission power of the second wireless communication device, the detection of the second wireless communication device being based on the determination that one or more transmissions by the second wireless communication device affect transmission by the first wireless communication device.

Aspect 26: The wireless communication device of any of Aspects 19 to 25, wherein the processor-readable code, when executed by the at least one processor in conjunction with the at least one modem, is configured to: perform a beacon scan to identify wireless communication devices within a wireless communication range of the first wireless communication device.

Aspect 27: The wireless communication device of any of Aspects 19 to 26, wherein detecting the second wireless communication device is based on at least one of a basic service set (BSS) color, a received signal strength indication (RSSI), a media access control (MAC) address, or a BSS identifier (BSSID).

Aspect 28: The wireless communication device of any of Aspects 19 to 27, wherein, to detect the second wireless communication device, the processor-readable code, when executed by the at least one processor in conjunction with the at least one modem, is configured to: receive, from the second wireless communication device on the first channel, a physical layer protocol data unit (PPDU); identify a format of the PPDU; and determine the second EDT based on the format of the PPDU.

Aspect 29: The wireless communication device of any of Aspects 19 to 28, wherein, to detect the second wireless communication device, the processor-readable code, when executed by the at least one processor in conjunction with the at least one modem, is configured to: transmit a message to a third wireless communication device, wirelessly connected with the first wireless communication device, that indicates to the third wireless communication device to sniff for packets from other wireless communication devices within a wireless communication range of the third wireless communication device; and receive a report, from the third wireless communication device, that includes information indicating a presence of the second wireless communication device.

Aspect 30: The wireless communication device of any of Aspects 19 to 29, wherein, to modify the transmission configuration, the processor-readable code, when executed by the at least one processor in conjunction with the at least one modem, is configured to: switch from communicating on the first channel to communicating on a second channel.

Aspect 31: The wireless communication device of any of Aspects 19 to 30, wherein, to modify the transmission configuration, the processor-readable code, when executed by the at least one processor in conjunction with the at least one modem, is configured to: transmit a trigger frame on the first channel that does not require a responding device to consider a medium state or a network allocation vector in determining whether or not to respond to the trigger frame.

Aspect 32: The wireless communication device of any of Aspects 19 to 31, wherein, to transmit the data based on the modified transmission configuration, the processor-readable code, when executed by the at least one processor in conjunction with the at least one modem, is configured to: transmit the data without first transmitting a request to send (RTS) message.

Aspect 33: The wireless communication device of any of Aspects 19 to 32, wherein the first channel is associated with a first frequency band and wherein: to modify the transmission configuration, the processor-readable code, when executed by the at least one processor in conjunction with the at least one modem, is configured to identify that a second channel of the first frequency band is unavailable for transmitting the data; and the processor-readable code, when executed by the at least one processor in conjunction with the at least one modem, is configured to transmit the data using a channel of a second frequency band that is different from the first frequency band based on identifying that the second channel is unavailable for transmitting the data.

Aspect 34: The wireless communication device of any of Aspects 19 to 33, wherein: to modify the transmission configuration, the processor-readable code, when executed by the at least one processor in conjunction with the at least one modem, is configured to perform a preamble puncturing operation to avoid transmission using a first bandwidth configured for use by the second wireless communication device; and the processor-readable code, when executed by the at least one processor in conjunction with the at least one modem, is configured to transmit the data using a second bandwidth based on the preamble puncturing operation.

Aspect 35: The wireless communication device of any of Aspects 19 to 34, wherein, to modify the transmission configuration, the processor-readable code, when executed by the at least one processor in conjunction with the at least one modem, is configured to: switch from using the first EDT to using the second EDT for detecting a channel busy condition.

Aspect 36: The wireless communication device of any of Aspects 19 to 35, wherein, to modify the transmission configuration, the processor-readable code, when executed by the at least one processor in conjunction with the at least one modem, is configured to: reduce a transmission power of the first wireless communication device based on a received signal strength indication (RSSI) from the second wireless communication device.

Aspect 37: A computer-readable storage medium storing instructions that, when executed by one or more processors, cause the one or more processors to perform operations according to any of Aspects 1 to 36.

Aspect 38: An apparatus comprising one or more means for performing operations according to any of Aspects 1 to 36.

What is claimed is:

1. A method for wireless communication by a first wireless communication device configured with a first energy detection (ED) threshold (EDT) for detecting a channel busy condition on a first channel, comprising:
   detecting a second wireless communication device configured with a second EDT for detecting a channel busy condition on the first channel, the second EDT being greater than the first EDT;
   modifying, based on the detection of the second wireless communication device, a transmission configuration of the first wireless communication device, wherein modifying the transmission configuration comprises performing a preamble puncturing operation to avoid transmission using a first bandwidth associated with the second wireless communication device; and
   transmitting data based on the modified transmission configuration.

2. The method of claim 1, wherein the first EDT is based on a transmission power of the first wireless communication device, and wherein the second EDT is a fixed value.

3. The method of claim 1, further comprising:
   performing a beacon scan to identify wireless communication devices within a wireless communication range of the first wireless communication device.

4. The method of claim 1, wherein detecting the second wireless communication device is based on at least one of a basic service set (BSS) color, a received signal strength indication (RSSI), a media access control (MAC) address, or a BSS identifier (BSSID).

5. The method of claim 1, wherein detecting the second wireless communication device comprises:
   receiving, from the second wireless communication device on the first channel, a physical layer protocol data unit (PPDU);
   identifying a format of the PPDU; and
   determining the second EDT based on the format of the PPDU.

6. The method of claim 1, wherein transmitting the data based on the modified transmission configuration comprises:
   transmitting the data without first transmitting a request to send (RTS) message.

7. The method of claim 1, wherein the first channel is in a first frequency band and the second channel is in a second different frequency band.

8. The method of claim 1, wherein modifying the transmission configuration further comprises one or more of:
   switching from communicating on the first channel to communicating on a second channel;
   transmitting a trigger frame on the first channel that does not require a responding device to consider a medium state or a network allocation vector in determining whether or not to respond to the trigger frame;
   switching from using the first EDT to using the second EDT for detecting a channel busy condition; or
   reducing a transmission power of the first wireless communication device based on a received signal strength indication (RSSI) associated with the second wireless communication device.

9. The method of claim 1, wherein transmitting the data comprises transmitting the data using a second bandwidth based on the preamble puncturing operation.

10. A method for wireless communication by a first wireless communication device configured with a first energy detection (ED) threshold (EDT) for detecting a channel busy condition on a first channel, comprising:
    detecting a second wireless communication device configured with a second EDT for detecting a channel busy condition on the first channel, the second EDT being greater than the first EDT, wherein the detection of the second wireless communication device comprises:
       obtaining a beacon report that indicates a presence of the second wireless communication device;
       determining a transmission power of the second wireless communication device based on information in the beacon report; and determining that transmission by the second wireless communication device affects transmission by the first wireless communication device based on the transmission power of the second wireless communication device, the detection of the second wireless communication device being based on the determination that transmission by the second wireless communication device affects transmission by the first wireless communication device;

modifying, based on the detection of the second wireless communication device, a transmission configuration of the first wireless communication device; and transmitting data based on the modified transmission configuration.

11. The method of claim 10, wherein the beacon report includes a binary value indicating the presence of the second wireless communication device.

12. The method of claim 10, wherein the beacon report includes a counter value identifying a number of wireless communication devices configured with the second EDT.

13. The method of claim 10, wherein detecting the second wireless communication device comprises:

transmitting a request to a third wireless communication device, wirelessly connected with the first wireless communication device, to perform a beacon scan, wherein the beacon report is received from the third wireless communication device based on the beacon scan.

14. A method for wireless communication by a first wireless communication device configured with a first energy detection (ED) threshold (EDT) for detecting a channel busy condition on a first channel, comprising:

detecting a second wireless communication device configured with a second EDT for detecting a channel busy condition on the first channel, the second EDT being greater than the first EDT, wherein the detection of the second wireless communication device comprises:

transmitting a message to a third wireless communication device, wirelessly connected with the first wireless communication device, that indicates to the third wireless communication device to sniff for packets from other wireless communication devices within a wireless communication range of the third wireless communication device; and receiving a report, from the third wireless communication device, that includes information indicating a presence of the second wireless communication device;

modifying, based on the detection of the second wireless communication device, a transmission configuration of the first wireless communication device; and transmitting data based on the modified transmission configuration.

15. A wireless communication device configured with a first energy detection (ED) threshold (EDT) for detecting a channel busy condition on a first channel, comprising:

at least one modem;

at least one processor communicatively coupled with the at least one modem; and at least one memory communicatively coupled with the at least one processor and storing processor-readable code that, when executed by the at least one processor in conjunction with the at least one modem, is configured to:

detect a second wireless communication device configured with a second EDT for detecting a channel busy condition on the first channel, the second EDT being greater than the first EDT;

modify, based on the detection of the second wireless communication device, a transmission configuration of the first wireless communication device, wherein modifying the transmission configuration comprises performing a preamble puncturing operation to avoid transmission using a first bandwidth associated with the second wireless communication device; and transmit data based on the modified transmission configuration.

16. The wireless communication device of claim 15, wherein the first EDT is based on a transmission power of the first wireless communication device, and wherein the second EDT is a fixed value.

17. The wireless communication device of claim 15, wherein the processor-readable code, when executed by the at least one processor in conjunction with the at least one modem, is configured to:

perform a beacon scan to identify wireless communication devices within a wireless communication range of the first wireless communication device.

18. The wireless communication device of claim 15, wherein detecting the second wireless communication device is based on at least one of a basic service set (BSS) color, a received signal strength indication (RSSI), a media access control (MAC) address, or a BSS identifier (BSSID).

19. The wireless communication device of claim 15, wherein, to detect the second wireless communication device, the processor-readable code, when executed by the at least one processor in conjunction with the at least one modem, is configured to:

receive, from the second wireless communication device on the first channel, a physical layer protocol data unit (PPDU);

identify a format of the PPDU; and determine the second EDT based on the format of the PPDU.

20. The wireless communication device of claim 15, wherein, to transmit the data based on the modified transmission configuration, the processor-readable code, when executed by the at least one processor in conjunction with the at least one modem, is configured to:

transmit the data without first transmitting a request to send (RTS) message.

21. The wireless communication device of claim 15, wherein the first channel is in a first frequency band and the second channel is in a second different frequency band.

22. The wireless communication device of claim 15, wherein modifying the transmission configuration further comprises one or more of:

switching from communicating on the first channel to communicating on a second channel;

transmitting a trigger frame on the first channel that does not require a responding device to consider a medium state or a network allocation vector in determining whether or not to respond to the trigger frame;

switching from using the first EDT to using the second EDT for detecting a channel busy condition; or reducing a transmission power of the first wireless communication device based on a received signal strength indication (RSSI) associated with the second wireless communication.

23. The wireless communication device of claim 15, wherein the processor-readable code, when executed by the at least one processor in conjunction with the at least one modem, is configured to transmit the data using a second bandwidth based on the preamble puncturing operation.

24. A wireless communication device configured with a first energy detection (ED) threshold (EDT) for detecting a channel busy condition on a first channel, comprising:
- at least one modem;
- at least one processor communicatively coupled with the at least one modem; and
- at least one memory communicatively coupled with the at least one processor and storing processor-readable code that, when executed by the at least one processor in conjunction with the at least one modem, is configured to:
  - detect a second wireless communication device configured with a second EDT for detecting a channel busy condition on the first channel, the second EDT being greater than the first EDT, wherein the detection of the second wireless communication device comprises:
    - obtaining a beacon report that indicates a presence of the second wireless communication device;
    - determining a transmission power of the second wireless communication device based on information in the beacon report; and
    - determining that one or more transmissions by the second wireless communication device affect transmission by the first wireless communication device based on the transmission power of the second wireless communication device, the detection of the second wireless communication device being based on the determination that one or more transmissions by the second wireless communication device affect transmission by the first wireless communication device;
  - modify, based on the detection of the second wireless communication device, a transmission configuration of the first wireless communication device; and
  - transmit data based on the modified transmission configuration.

25. The wireless communication device of claim 24, wherein the beacon report includes a binary value indicating the presence of the second wireless communication device.

26. The wireless communication device of claim 24, wherein the beacon report includes a counter value identifying a number of wireless communication devices configured with the second EDT.

27. The wireless communication device of claim 24, wherein, to detect the second wireless communication device, the processor-readable code, when executed by the at least one processor in conjunction with the at least one modem, is configured to:
- transmit a request to a third wireless communication device, wirelessly connected with the first wireless communication device, to perform a beacon scan, wherein the beacon report is received from the third wireless communication device based on the beacon scan.

28. A wireless communication device configured with a first energy detection (ED) threshold (EDT) for detecting a channel busy condition on a first channel, comprising:
- at least one modem;
- at least one processor communicatively coupled with the at least one modem; and
- at least one memory communicatively coupled with the at least one processor and storing processor-readable code that, when executed by the at least one processor in conjunction with the at least one modem, is configured to:
  - detect a second wireless communication device configured with a second EDT for detecting a channel busy condition on the first channel, the second EDT being greater than the first EDT, wherein the detection of the second wireless communication device comprises:
    - transmitting a message to a third wireless communication device, wirelessly connected with the first wireless communication device, that indicates to the third wireless communication device to sniff for packets from other wireless communication devices within a wireless communication range of the third wireless communication device; and
    - receiving a report, from the third wireless communication device, that includes information indicating a presence of the second wireless communication device;
  - modify, based on the detection of the second wireless communication device, a transmission configuration of the first wireless communication device; and
  - transmit data based on the modified transmission configuration.

* * * * *